United States Patent
Kobayashi

(10) Patent No.: US 11,189,203 B2
(45) Date of Patent: Nov. 30, 2021

(54) LIQUID CRYSTAL DEVICE, LIQUID CRYSTAL DRIVER, ELECTRONIC APPARATUS, AND MOBILE BODY

(71) Applicant: SEIKO EPSON CORPORATION, Tokyo (JP)

(72) Inventor: Hironori Kobayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/752,974

(22) Filed: Jan. 27, 2020

(65) Prior Publication Data
US 2020/0242987 A1   Jul. 30, 2020

(30) Foreign Application Priority Data
Jan. 28, 2019  (JP) ............................ JP2019-011797

(51) Int. Cl.
G09G 3/00 (2006.01)
G09G 3/36 (2006.01)
G02F 1/1343 (2006.01)
G02F 1/13 (2006.01)

(52) U.S. Cl.
CPC .......... *G09G 3/006* (2013.01); *G02F 1/1309* (2013.01); *G09G 3/3685* (2013.01); *G09G 2330/12* (2013.01); *G09G 2370/08* (2013.01)

(58) Field of Classification Search
CPC .. G09G 3/04; G09G 3/18; G09G 3/19; G09G 3/16; G09G 3/045
See application file for complete search history.

(56) References Cited

U.S. PATENT DOCUMENTS

| | | | | |
|---|---|---|---|---|
| 3,735,181 A | * | 5/1973 | Kobayakawa | ........ H01J 17/491 |
| | | | | 313/517 |
| 4,447,133 A | * | 5/1984 | Miyoshi | ................ G02F 1/1525 |
| | | | | 359/265 |
| 4,541,066 A | * | 9/1985 | Lewandowski | ....... G06F 11/162 |
| | | | | 702/117 |
| 4,734,688 A | * | 3/1988 | Adams | .................. G06F 11/162 |
| | | | | 345/50 |
| 4,811,005 A | * | 3/1989 | Khalek | .................... G09G 3/04 |
| | | | | 340/642 |

(Continued)

FOREIGN PATENT DOCUMENTS

| | | |
|---|---|---|
| JP | S54-96394 A | 7/1979 |
| JP | H01-213623 A | 8/1989 |

(Continued)

*Primary Examiner* — Sepehr Azari
(74) *Attorney, Agent, or Firm* — Oliff PLC

(57) ABSTRACT

A liquid crystal device (300) includes a liquid crystal panel (200) and a liquid crystal driver (100) that drives the liquid crystal panel (200). The liquid crystal panel (200) includes a segment electrode (ESD1) and segment signal lines (LSD1, LSD2) that are connected to the segment electrode (ESD1). The liquid crystal driver (100) includes segment terminals (TSD1, TSD2) to be connected to the segment signal lines (LSD1, LSD2), and a segment driving circuit. The segment driving circuit outputs a first segment driving signal to the segment signal line (LSD1) through the segment terminal (TSD1), and outputs a second segment driving signal to the segment signal line (LSD2) through the segment terminal (TSD2).

16 Claims, 15 Drawing Sheets

(56) References Cited

U.S. PATENT DOCUMENTS

| | | | |
|---|---|---|---|
| 4,817,002 A * | 3/1989 | Sansone | G02F 1/163 |
| | | | 705/405 |
| 5,515,390 A * | 5/1996 | Benton | G06F 11/0754 |
| | | | 324/73.1 |
| 2002/0036629 A1 * | 3/2002 | Marnfeldt | G09G 3/04 |
| | | | 345/204 |
| 2008/0074136 A1 | 3/2008 | Shiraki et al. | |
| 2010/0117675 A1 | 5/2010 | Shiraki et al. | |
| 2013/0036335 A1 | 2/2013 | Kim et al. | |
| 2013/0057524 A1 * | 3/2013 | Bertin | H04N 5/44582 |
| | | | 345/204 |
| 2013/0082843 A1 | 4/2013 | Wurzel et al. | |
| 2014/0168198 A1 | 6/2014 | Tan et al. | |
| 2016/0170560 A1 * | 6/2016 | Zhan | G06F 3/044 |
| | | | 345/174 |

FOREIGN PATENT DOCUMENTS

| | | |
|---|---|---|
| JP | 2010-191351 A | 9/2010 |
| JP | 2014-019300 A | 2/2014 |
| JP | 2014-021275 A | 2/2014 |

* cited by examiner

LIQUID CRYSTAL DEVICE, LIQUID CRYSTAL DRIVER, ELECTRONIC APPARATUS, AND MOBILE BODY

The present application is based on, and claims priority from JP Application Serial Number 2019-011797, filed Jan. 28, 2019, the disclosure of which is hereby incorporated by reference herein in its entirety.

BACKGROUND

1. Technical Field

The present disclosure relates to a liquid crystal device, a liquid crystal driver, an electronic apparatus, a mobile body, and the like.

2. Related Art

Segment type liquid crystal devices are known in which liquid crystal cells having shapes in accordance with the shapes of items to be displayed are provided in a liquid crystal panel. The liquid crystal cell includes a liquid crystal, and a segment electrode and a common electrode for applying a voltage to the liquid crystal. The liquid crystal device includes a liquid crystal driver that drives the liquid crystal panel, and the liquid crystal driver controls the light transmittance of the liquid crystal by driving the segment electrode and the common electrode. As a result of the liquid crystal driver controlling the light transmittance of the liquid crystal, an item to be displayed is displayed in the liquid crystal panel. Note that the liquid crystal device is not limited to the display device, and is used in a liquid crystal shutter that controls transmission and blocking of light, and the like.

Known technologies of the liquid crystal device are disclosed in JP-A-54-96394 and JP-A-1-213623, for example. In the technology in JP-A-54-96394, one segment electrode and the liquid crystal driver are connected by one signal line, and the liquid crystal driver drives the segment electrode by outputting a segment driving signal to the signal line. In JP-A-1-213623, lead wires are connected to two ends of each scan electrode in a dot matrix-type liquid crystal display device in which a signal electrode group and a scan electrode group intersect each other.

In a segment-type liquid crystal device, if the output of the liquid crystal driver is anomalous, the segment electrodes cannot be properly driven. When a display is taken as an example, as a result of a segment electrode being not properly driven, an anomalous display occurs. In JP-A-54-96394 described above, one segment electrode and the liquid crystal driver are connected by one signal line. Therefore, there is a problem in that, if an anomaly such as disconnection has occurred in the signal line, the segment electrode is no longer properly driven.

SUMMARY

One aspect of the present disclosure relates to a liquid crystal device including a liquid crystal panel, and a liquid crystal driver configured to drive the liquid crystal panel. The liquid crystal panel includes: a first segment electrode; a first segment signal line connected to the first segment electrode; and a second segment signal line connected to the first segment electrode. The liquid crystal driver includes: a first segment terminal to be connected to the first segment signal line; a second segment terminal to be connected to the second segment signal line; and a segment driving circuit configured to output a first segment driving signal to the first segment signal line through the first segment terminal, and output a second segment driving signal to the second segment signal line through the second segment terminal.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a preferable embodiment of the disclosure will be described in detail. Note that the embodiment described below is not intended to unduly limit the content of the disclosure described in the scope of the claims, and not all configurations described in this embodiment are necessarily essential as solving means of the disclosure.

1. First Exemplary Configuration of Liquid Crystal Device

A case where the liquid crystal device is a liquid crystal display device will be described in the following, as an example, but the liquid crystal device is not limited to the liquid crystal display device. For example, the liquid crystal device may be a liquid crystal shutter. An exemplary configuration of the liquid crystal shutter will be described later.

Figure 1:
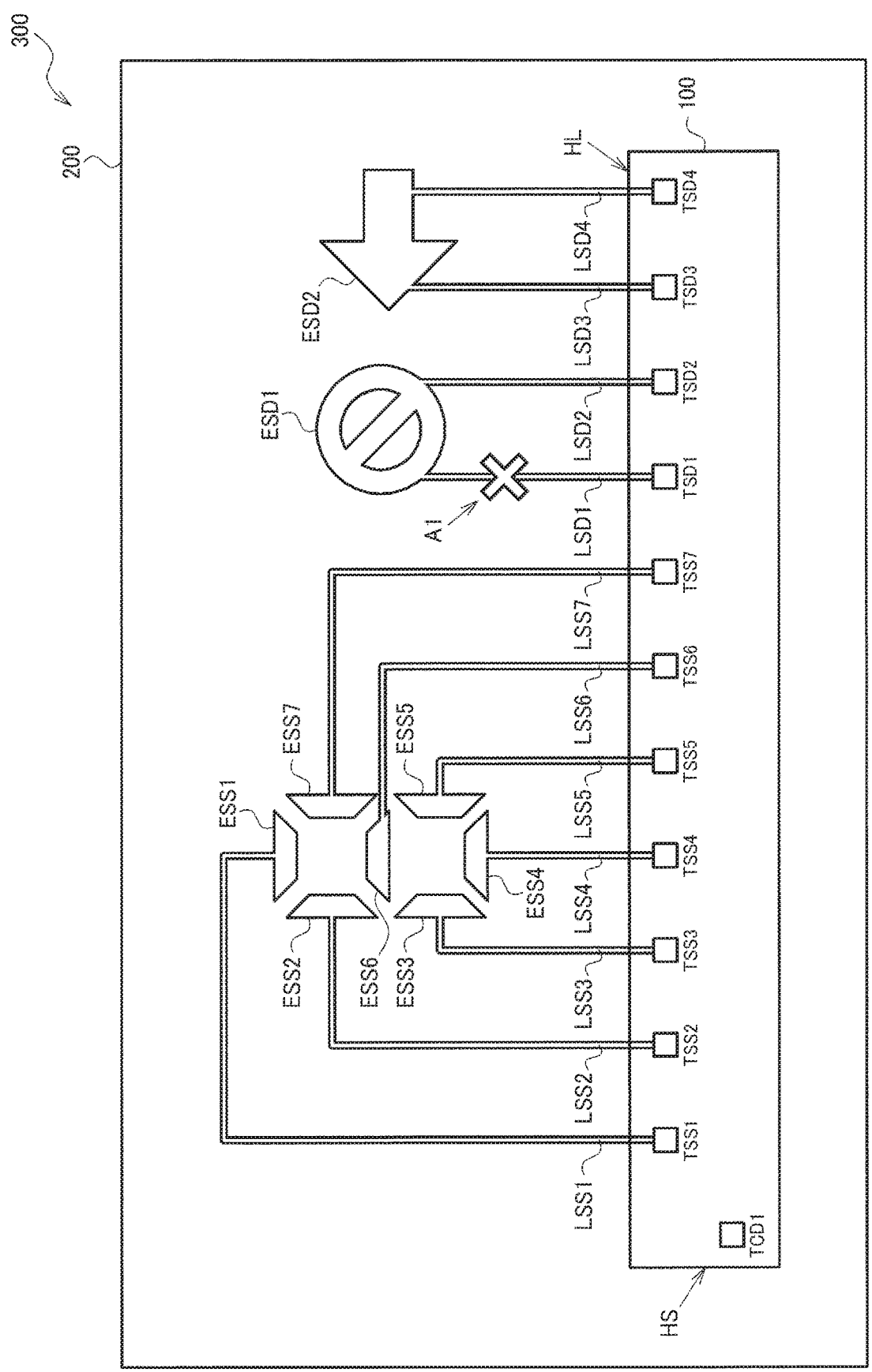
FIG. 1 is a first exemplary configuration of a liquid crystal device.
Figure 2:
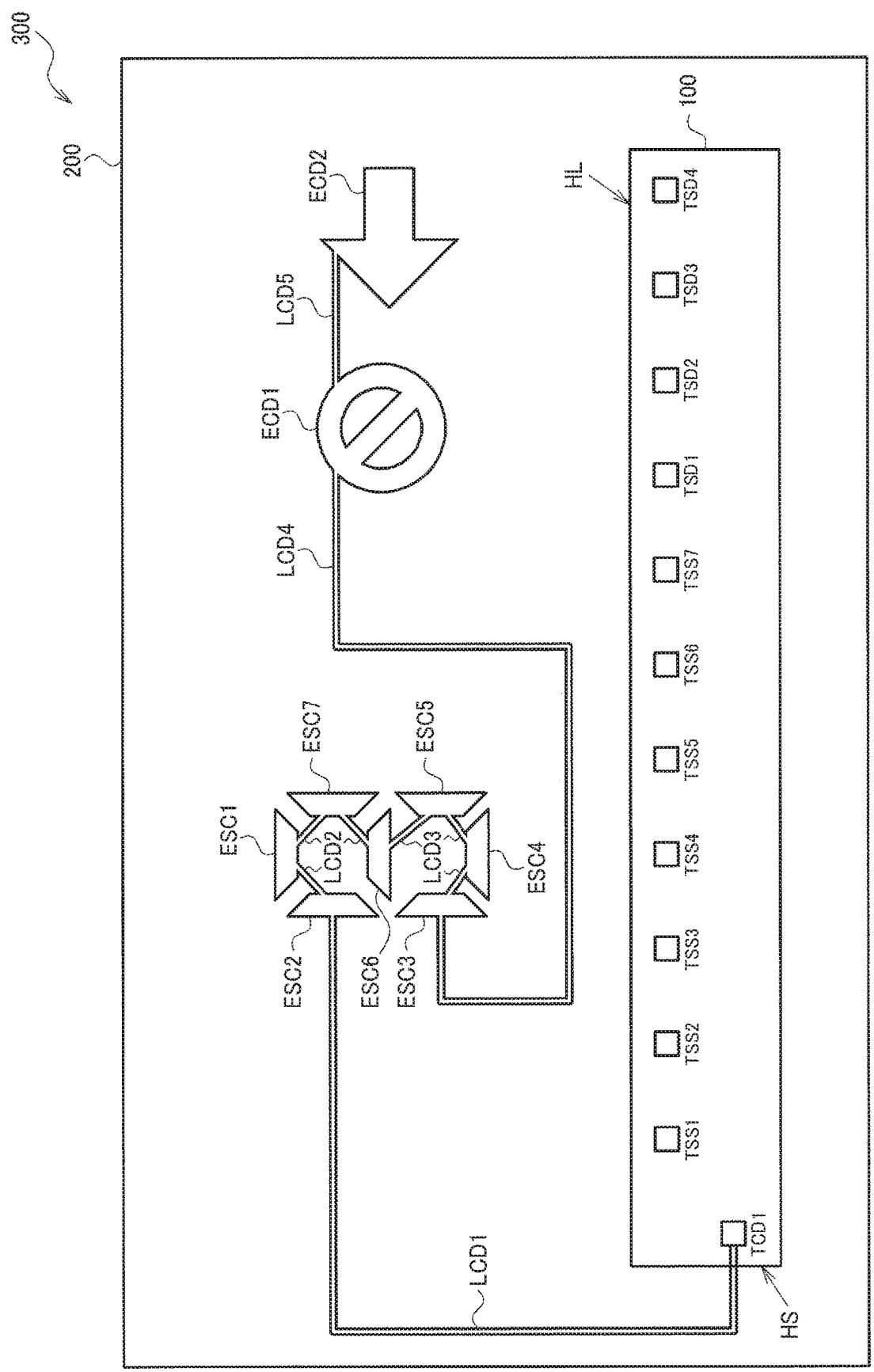
FIG. 2 is the first exemplary configuration of the liquid crystal device.

FIGS. 1 and 2 show a first exemplary configuration of a liquid crystal device 300. The liquid crystal device 300 includes a liquid crystal panel 200 and a liquid crystal driver 100 that drives the liquid crystal panel 200. Segment electrodes and an exemplary connection configuration thereof are shown in FIG. 1, and common electrodes and an exemplary connection configuration thereof are shown in FIG. 2. Note that the liquid crystal panel 200 includes a glass substrate on which the segment electrodes are provided, a glass substrate on which the common electrodes are provided, and a liquid crystal provided therebetween. Note that these constituent elements are not illustrated in FIGS. 1 and 2, and the detail thereof will be described later.

As shown in FIG. 1, the liquid crystal panel 200 includes segment electrodes ESD1 to ESD4, and ESS1 to ESS7, and segment signal lines LSD1 to LSD4 and LSS1 to LSS7. The liquid crystal driver 100 includes segment terminals TSD1 to TSD4 and TSS1 to TSS7.

The segment electrodes and the segment signal lines are transparent conductive films provided on the glass substrate. The transparent conductive films are made of ITO (Indium Tin Oxide), for example. Portions, of the transparent conductive films, that face the common electrodes, with the liquid crystal being interposed therebetween are segment electrodes, and portions that supply segment driving signals to the respective segment electrodes are segment signal lines. For example, the segment electrode ESD1 and the segment signal lines LSD1 and LSD2 are formed by an integrated transparent conductive film. A portion, of the transparent conductive film, that faces the common electrode ECD1 in FIG. 2 is the segment electrode ESD1.

The liquid crystal driver 100 is mounted on the glass substrate of the liquid crystal panel 200. Specifically, the liquid crystal driver 100 is an integrated circuit device, and pads formed on a semiconductor substrate thereof correspond to the segment terminals TSD1 to TSD4 and TSS1 to TSS7. Also, the semiconductor substrate is mounted on the liquid crystal panel 200 such that the face on which the pads are provided faces the glass substrate of the liquid crystal panel 200. Here, the segment terminal TSD1 is connected to the segment signal line LSD1 via a metal bump, for example. Similarly, the segment terminals TSD2 to TSD4 and TSS1 to TSS7 are respectively connected to the segment signal lines LSD2 to LSD4 and LSS1 to LSS7. Note that FIG. 1 shows a state in which a face, of the faces of the semiconductor substrates, on which the segment terminals are not provided is visible, but the segment terminals and the like that are hidden by the semiconductor substrate are also illustrated.

The liquid crystal driver 100 drives the segment electrode ESD1 through the segment signal lines LSD1 and LSD2 by outputting a segment driving signal from the segment terminals TSD1 and TSD2. Note that the liquid crystal driver 100 is configured to be able to select whether or not the segment driving signal is to be output from the segment terminal TSD2, as will be described later. The segment electrode ESD1 has a predetermined icon shape, and as a result of the liquid crystal driver 100 driving the segment electrode ESD1, the icon is controlled to be displayed or not to be displayed.

Similarly, the liquid crystal driver 100 drives the segment electrode ESD2 by outputting a segment driving signal from the segment terminals TSD3 and TSD4.

The liquid crystal driver 100 drives the segment electrodes ESS1 to ESS7 by outputting segment driving signals from the segment terminal TSS1 to TSS7 through the segment signal line LSS1 to LSS7, respectively. The segment electrodes ESS1 to ESS7 are shaped so as to display a numeric character. As a result of the liquid crystal driver 100 driving the segment electrodes ESS1 to ESS7, the numeric character is controlled to be displayed or not to be displayed, or the type of the numeric character to be displayed is changed. The segment electrodes ESS1 to ESS7 are each connected to the liquid crystal driver 100 only by one segment signal line, in the present embodiment.

Assume that an anomaly has occurred in the segment signal line LSD1 of the liquid crystal panel 200, as indicated by A1. The anomaly in a segment signal line is disconnection of the segment signal line, for example. Here, the segment driving signal output from the segment terminal TSD1 is no longer applied to the segment electrode ESD1. In this regard, according to the present embodiment, the segment driving signal is output to the segment signal line LSD2 through the segment terminal TSD2 along with the segment driving signal being output to the segment signal line LSD1 through the segment terminal TSD1. With this, even if an anomaly has occurred in the segment signal line LSD1, the segment driving signal is applied to the segment electrode ESD1 from the segment signal line LSD2.

The cause of anomalous driving of the segment electrode may be a failure in connection between the segment terminal and the segment signal line, or an anomaly in the segment driving signal output from the segment terminal TSD1, in addition to the anomaly in the segment signal line described above.

Also, without being limited to the anomaly in the segment signal line LSD1, there are cases where a failure occurs in connection between the segment terminal TSD1 and the segment signal line LSD1, and the segment driving signal output from the segment terminal TSD1 is anomalous. The anomaly in the segment driving signal indicates a state in which the segment terminal TSD1 is in a high impedance state due to a circuit failure, a disconnection, or the like in the liquid crystal driver 100.

In FIG. 1, ESD1 is denoted as a first segment electrode, and ESS1 is denoted as a second segment electrode. ESD1, which is the first segment electrode, is connected to the liquid crystal driver 100 via LSD1, which is a first segment signal line, and LSD2, which is a second segment signal line. ESS1, which is the second segment electrode, is connected to the liquid crystal driver 100 via LSS1, which is a third segment signal line. Specifically, the second segment electrode is connected to the liquid crystal driver 100 via only the third segment signal line. Also, LSD1, which is the first segment signal line, is connected to the driver 100 via TSD1, which is a first segment terminal of the driver 100, and LSD2, which is the second segment signal line, is connected to the driver 100 via TSD2, which is a second segment terminal.

In this way, a segment electrode to be driven through two segment terminals and two segment signal lines and a segment electrode to be driven through one segment terminal and one segment signal line can be provided in the liquid crystal panel 200. Selection can be made depending on the importance of an item to be displayed, as will be described in the following, for example.

A cluster panel for an automobile can be envisioned as the liquid crystal device 300, for example. Segment electrodes for displaying icons, numeric characters, characters, meters, and the like are provided in the cluster panel.

Out of these segment electrodes, segment electrodes whose importance is relatively high are each connected to two segment terminals via two segment signal lines. In the example in FIG. 1, the segment electrodes ESD1 and ESD2 for displaying icons are each connected to two segment terminals via two segment signal lines.

On the other hand, segment electrodes whose importance is relatively low are each connected to only one segment terminal via one segment signal line. In the example in FIG. 1, the segment electrodes ESS1 to ESS7 for displaying a numeric character are each connected to one segment terminal via one segment signal line. Note that, when the liquid crystal panel 200 includes segment electrodes for displaying a character or a meter, these segment electrodes may each be connected to only one segment terminal via one segment signal line.

In this way, in a segment electrode whose importance is relatively high, if an anomaly has occurred in one of two segment signal lines connected to the segment electrode, driving can be continued using the other segment signal line. Also, as a result of providing only one segment terminal and one segment signal line to a segment electrode whose importance is relatively low, the circuit scale of the liquid crystal driver 100 can be reduced.

Next, the common electrode will be described. As shown in FIG. 2, the liquid crystal panel 200 includes common electrodes ECD1, ECD2, and ECS1 to ECS7 and common signal lines LCD1 to LCD5. The liquid crystal driver 100 includes a common terminal TCD1.

The common electrodes and the common signal lines are transparent conductive films provided on the glass substrate. Portions, of the transparent conductive films, that face the segment electrodes, with the liquid crystal being interposed therebetween are common electrodes, and portions that supply common driving signals to the common electrodes are common signal lines.

The common terminal TCD1 are pads formed on the semiconductor substrate of the liquid crystal driver 100. The common terminal TCD1 is connected to the common signal line LCD1 via a metal bump, for example.

The common electrode ECS1 faces the segment electrode ESS1 with the liquid crystal being interposed therebetween. Similarly, the common electrodes ECS2 to ECS7, ECD1, and ECD2 respectively face the segment electrodes ESS2 to ESS7, ESD1, and ESD2 with the liquid crystal being interposed therebetween. The common electrodes ECS1 to ECS7, ECD1, and ECD2 are connected in series by the common signal lines LCD1 to LCD5. That is, the common signal line LCD1 is connected to the common electrode ECS2, and the common electrodes ECS2, ECS1, ECS7, and ECS6 are connected in series in the stated order by common signal lines LCD2. Also, the common electrodes ECS6, ECS5, ECS4, and ECS3 are connected in series in the stated order by common signal lines LCD3. Also, the common electrode ECS3 and the common electrode ECD1 are connected by a common signal line LCD4, the common electrode ECD1 and the common electrode ECD2 are connected by a common signal line LCD5.

The liquid crystal driver 100 drives the common electrodes ECS1 to ECS7, ECD1, and ECD2 through the common signal lines LCD1 to LCD5 by outputting a common driving signal from the common terminal TCD1.

Note that, a common driving signal may be output to a common electrode from two common terminals, similarly to the segment electrode. That is, the liquid crystal driver 100 may include a first common terminal to be connected to a first common signal line, a second common terminal to be connected to a second common signal line, and a common driving circuit. Also, the common driving circuit may output the common driving signal to the first common signal line through the first common terminal, and output the common driving signal to the second common signal line through the second common terminal. For example, in FIG. 2, LCD1 indicates the first common signal line, and TCD1 indicates the first common terminal. Here, the liquid crystal driver 100 is also provided with the second common terminal, and the second common terminal and the common electrode ECD2 are connected by the second common signal line.

2. Second and Third Exemplary Configurations of Liquid Crystal Device.

In the liquid crystal driver 100 in FIGS. 1 and 2, the segment terminal TSD1, which is a first segment terminal, and the segment terminal TSD2, which is a second segment terminal are arranged adjacent to each other along a longitudinal direction of the liquid crystal driver 100. Similarly, the segment terminal TSD3 and the segment terminal TSD4 are arranged adjacent to each other along the longitudinal direction. The longitudinal direction is a direction along a long side HL of the liquid crystal driver 100.

The plurality of segment signal lines provided in the liquid crystal panel 200 are transparent conductive films on a glass substrate, and therefore the segment signal lines cannot intersect to each other. In the present embodiment, the segment terminals TSD1 and TSD2 are arranged adjacent to each other, and as a result, the segment signal lines LSD1 and LSD2 that connect the segment electrode ESD1 and the segment terminals TSD1 and TSD2 can be routed such that the segment signal lines LSD1 and LSD2 do not intersect other segment signal lines. The same applies to the segment terminals TSD3 and TSD4.

Figure 3:
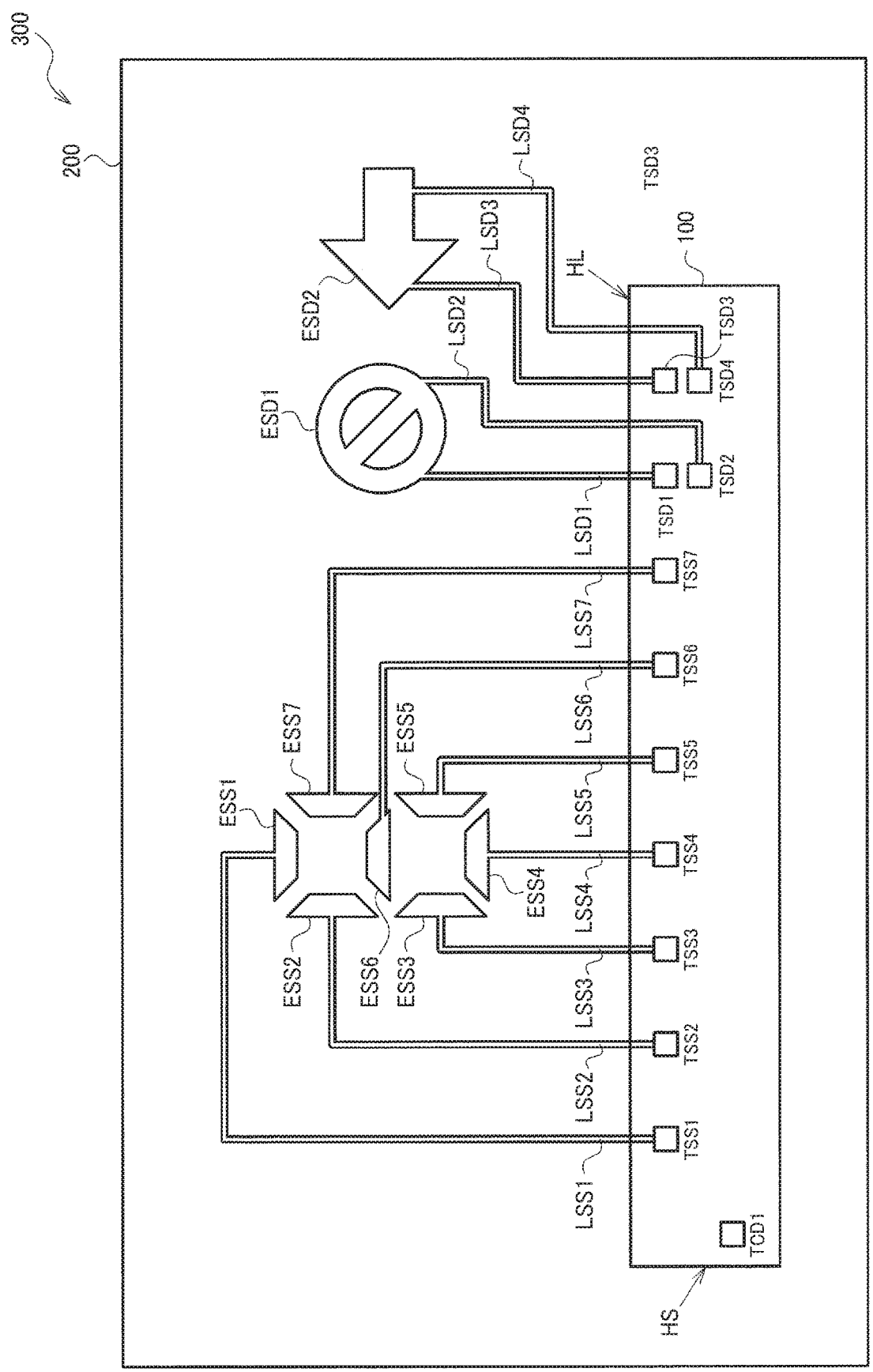
FIG. 3 is a second exemplary configuration of a liquid crystal device.

Note that the arrangement of the segment terminals is not limited to that described above. FIG. 3 is a second exemplary configuration of the liquid crystal device 300. In FIG. 3, the segment terminal TSD1, which is the first segment terminal, and the segment terminal TSD2, which is the second segment terminal are arranged adjacent to each other along a direction that intersects the longitudinal direction of the liquid crystal driver. Similarly, the segment terminal TSD3 and the segment terminal TSD4 are arranged adjacent to each other along the direction that intersects the longitudinal direction. The direction that intersects the longitudinal direction is a direction that intersects the long side HL of the liquid crystal driver 100, and is a direction along a short side HS of the liquid crystal driver 100, for example. With this, the segment signal lines LSD1 and LSD2 that connect the segment electrode ESD1 and the segment terminals TSD1 and TSD2 can be routed such that the segment signal lines LSD1 and LSD2 do not intersect other segment signal lines. The same applies to the segment terminals TSD3 and TSD4, and the size of the liquid crystal driver 100 in the longitudinal direction can be reduced.

As shown in FIGS. 1 and 3, the segment signal line LSD1 and the segment signal line LSD2 that are connected to the segment electrode ESD1 are routed adjacent to each other. Similarly, the segment signal line LSD3 and the segment signal line LSD4 that are connected to the segment electrode ESD2 are routed adjacent to each other. Two segment signal lines being routed adjacent to each other means that another segment signal line is not provided between the two segment signal lines. For example, the segment signal lines LSD1 and LSD2 that are connected to the segment electrode ESD1 are routed side by side. Note that the distance between the segment signal lines LSD1 and LSD2 that are routed side by side need not be constant.

It is conceivable that the segment signal line LSD2 is routed so as to make a detour such that the segment electrode ESD2, the segment signal lines LSD3 and LSD4, and the segment terminals TSD3 and TSD4 are arranged between the segment signal lines LSD1 and LSD2, for example. However, the routing length increases, and the routing is estimated to become complex. In this regard, according to the present embodiment, as a result of the segment signal lines LSD1 and LSD2 that are connected to the same segment electrode ESD1 being routed adjacent to each other, the segment signal lines LSD1 and LSD2 can be routed so as to not intersect other segment signal lines, while realizing simple routing.

Figure 4:
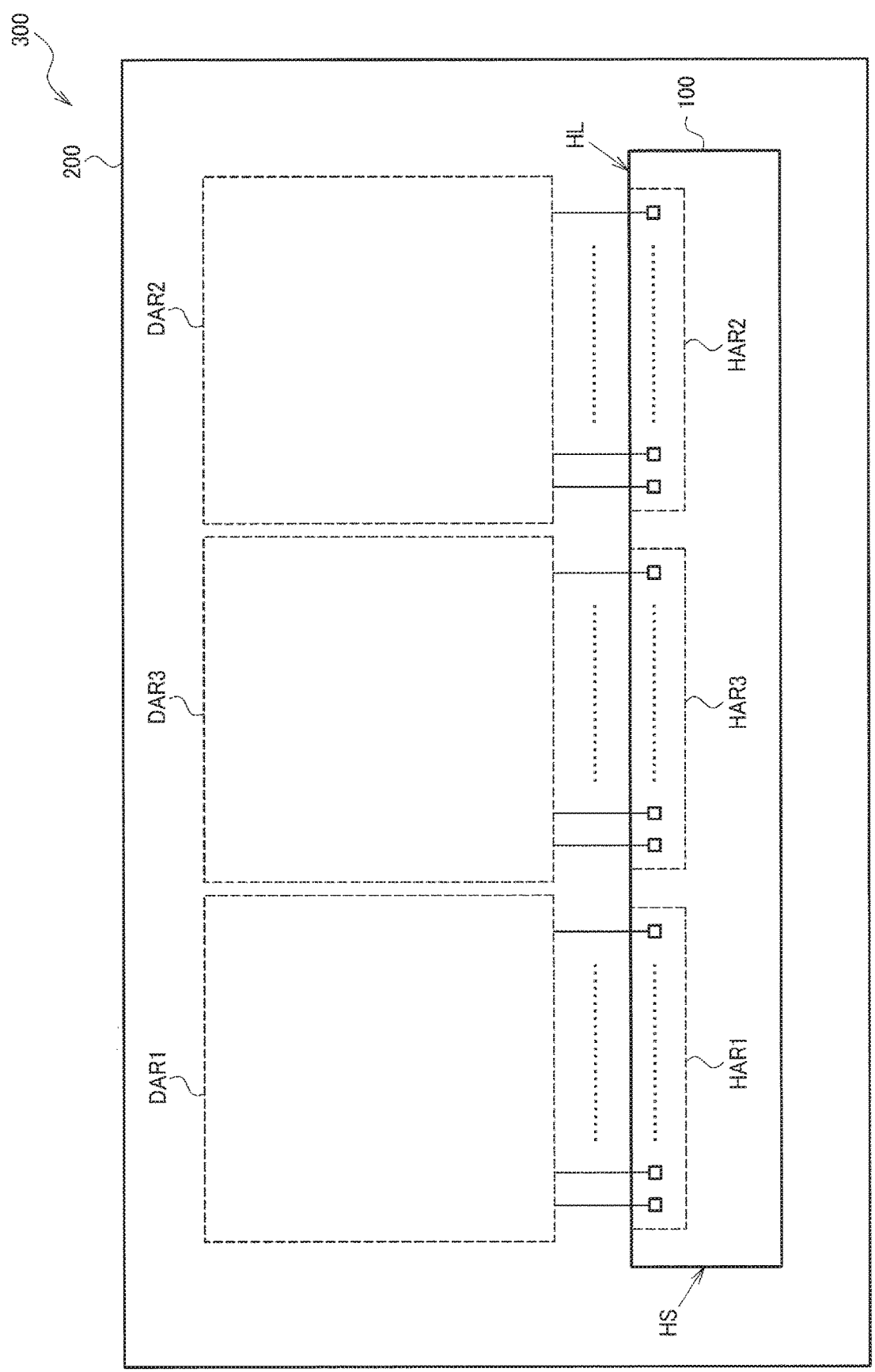
FIG. 4 is a third exemplary configuration of a liquid crystal device.

FIG. 4 is a third exemplary configuration of the liquid crystal device 300. In FIG. 4, the first segment terminal and the second segment terminal are arranged in a third region HAR3 between a first region HAR1 and a second region HAR2, on the long side HL of the liquid crystal driver 100. A third segment terminal is arranged in the first region HAR1 or the second region HAR2. The regions HAR1 to HAR3 are regions in which the segment terminals are arranged in the layout of the liquid crystal driver 100. The regions HAR1 to HAR3 are each rectangular, and the long side thereof is in parallel with the long side HL of the liquid crystal driver 100. For example, one of long sides of each of the regions HAR1 to HAR3 may be in contact with the long side HL of the liquid crystal driver 100.

When the segment electrodes or the like in FIG. 1 are taken as an example, the segment electrode ESD1 in FIG. 1 is the first segment electrode, and the segment signal lines LSD1 and LSD2 are respectively the first and second segment signal lines, and the segment terminals TSD1 and TSD2 are respectively the first and second segment terminals. Also, the segment electrode ESS1 in FIG. 1 is the second segment electrode, the segment signal line LSS1 is the third segment signal line, and the segment terminal TSS1 is the third segment terminal.

In the liquid crystal panel 200 in FIG. 4, the first segment electrode is arranged in a region DAR3 between a region DAR1 and a region DAR2. The second segment electrode is arranged in the region DAR1 or the region DAR2. A segment electrode arranged in the region DAR1 is to be connected to a segment terminal arranged in the region HAR1 of the liquid crystal driver 100. Similarly, segment electrodes arranged in the region DAR2 or DAR3 are to be connected to segment terminals arranged in the region HAR2 or HAR3 of the liquid crystal driver 100.

For example, when the liquid crystal device 300 is a cluster panel for an automobile, it is envisioned that icons are arranged in the region DAR3 around the center, and meters, numeric characters, and characters are arranged in the regions DAR1 and DAR2 on two sides of the region DAR3. As described above, when the importance of the icons are assumed to be relatively high, segment electrode of the icons that are arranged in the region DAR3 are each connected to the liquid crystal driver 100 with two segment signal lines. On the other hand, when the importance of the meters, numeric characters, and characters that are arranged in the regions DAR1 and DAR2 are assumed to be relatively low, the segment electrodes are each connected to the liquid crystal driver 100 with one segment signal line. That is, the liquid crystal driver 100 has a long side HL and short sides HS at the two ends thereof, and the region HAR3 is located further from the short sides HS across the respective regions HAR1 and HAR2, on the long side HL. Therefore, the first segment terminal and the second segment terminal are located further from one of the short sides HS relative to the third segment terminal, on the long side HL of the liquid crystal driver.

According to the configuration in FIG. 4 described above, when segment electrodes of display whose importance is high are arranged around the center, the segment terminals can be arranged in accordance with the arrangement.

3. Liquid Crystal Driver

Figure 5:
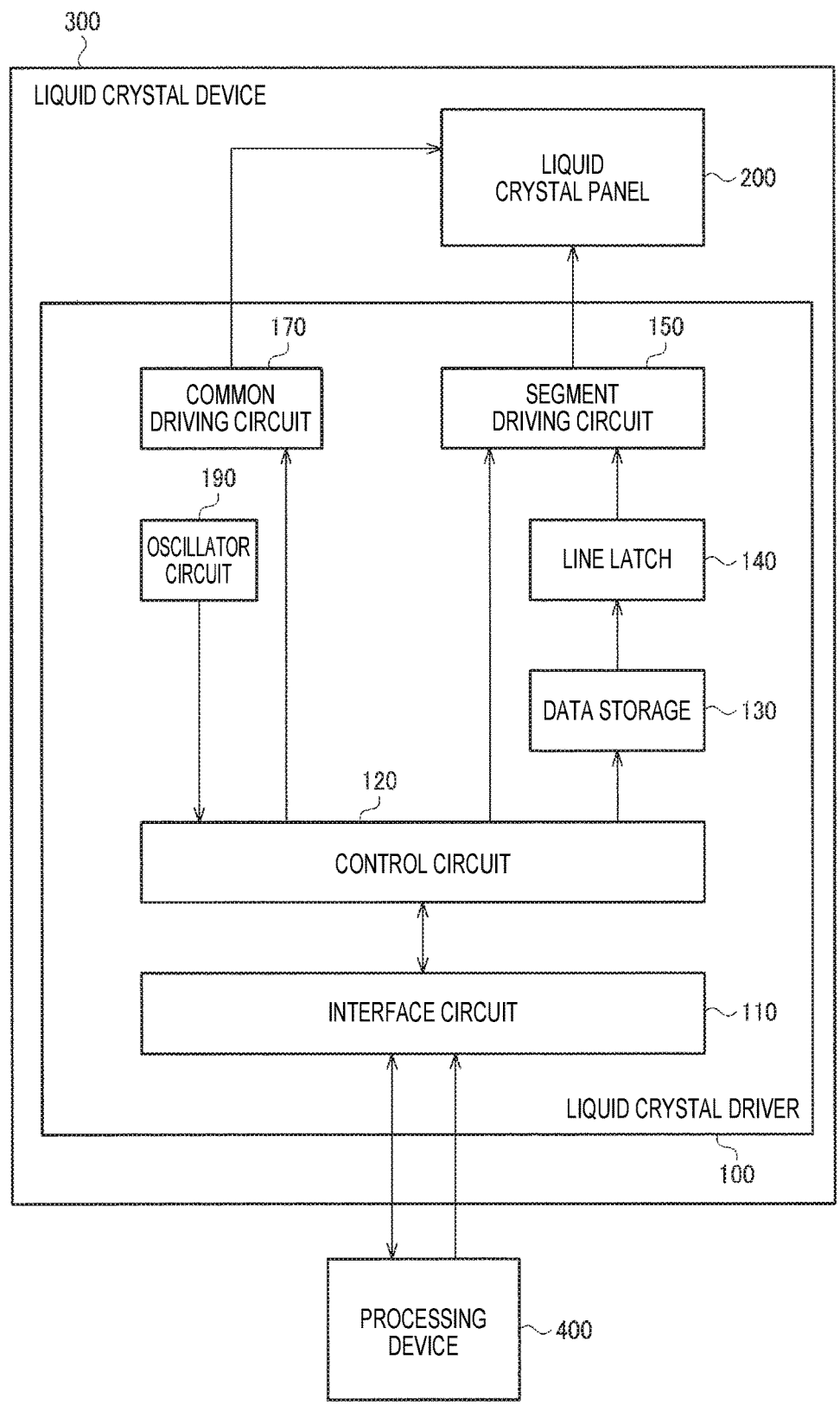
FIG. 5 is a first detailed exemplary configuration of a liquid crystal driver.

FIG. 5 is a first detailed exemplary configuration of the liquid crystal driver 100. The liquid crystal driver 100 includes an interface circuit 110, a control circuit 120, a data storage 130, a line latch 140, a common driving circuit 170, and an oscillator circuit 190.

The interface circuit 110 performs inter-circuit communication between the liquid crystal driver 100 and a processing device 400. Specifically, the interface circuit 110 receives segment driving data from the processing device 400. The segment driving data is data for controlling display with respect to each segment electrode. For example, in the case of static driving, the segment driving data is data for turning the display on or off with respect to the segment electrode. Alternatively, when PWM driving is performed in static driving, the segment driving data is data for setting the display tone with respect to a segment electrode. The processing device 400 is a host device of the liquid crystal driver 100, and is a processor or a display controller, for example. The processor is a CPU, a microcomputer, or the like. A serial interface system such as the I2C (Inter Integrated Circuit) system or the SPI (Serial Peripheral Interface) system can be adopted as the communication system of the interface circuit 110. Alternatively, a parallel interface system may be adopted as the communication system of the interface circuit 110. The interface circuit 110 can include an input/output buffer circuit and a control circuit for realizing such communication systems.

The control circuit 120 is a logic circuit, and operates based on a clock signal input from the oscillator circuit 190. The control circuit 120 controls the drive timing when the liquid crystal driver 100 drives the liquid crystal panel 200. Specifically, the control circuit 120 stores segment driving data received from the interface circuit 110 in the data storage 130. Also, the control circuit 120 performs control such that, in each frame, the segment driving circuit 150 outputs a segment driving signal corresponding to the frame. Also, the control circuit 120 performs control such that the driving polarity is inverted frame by frame.

The data storage 130 stores segment driving data. The data storage 130 is a so-called display data RAM. Alternatively, the data storage 130 may be a register.

The line latch 140 latches one frame's worth of segment driving data read out from the data storage 130. The line latch 140 is constituted by flip-flop circuits, for example.

The segment driving circuit 150 drives the segment electrodes of the liquid crystal panel 200 based on the segment driving data latched in the line latch 140. That is, the segment driving circuit 150 drives the segment electrodes by outputting segment driving signals corresponding to the segment driving data from the segment terminals, respectively. The segment driving signals are each a signal at a low level or a high level. In the case of the PWM driving, the segment driving signal changes from a high level to a low level, or from a low level to a high level in one frame. This change timing is determined in accordance with the tone.

The common driving circuit 170 drives the common electrodes of the liquid crystal panel 200. That is, the common driving circuit 170 drives the common electrodes by outputting a common driving signal in accordance with the polarity from the common terminal. The common driving signal is a signal at a low level when in a positive polarity, and a signal at a high level when in a negative polarity.

4. Segment Driving Circuit

Figure 6:
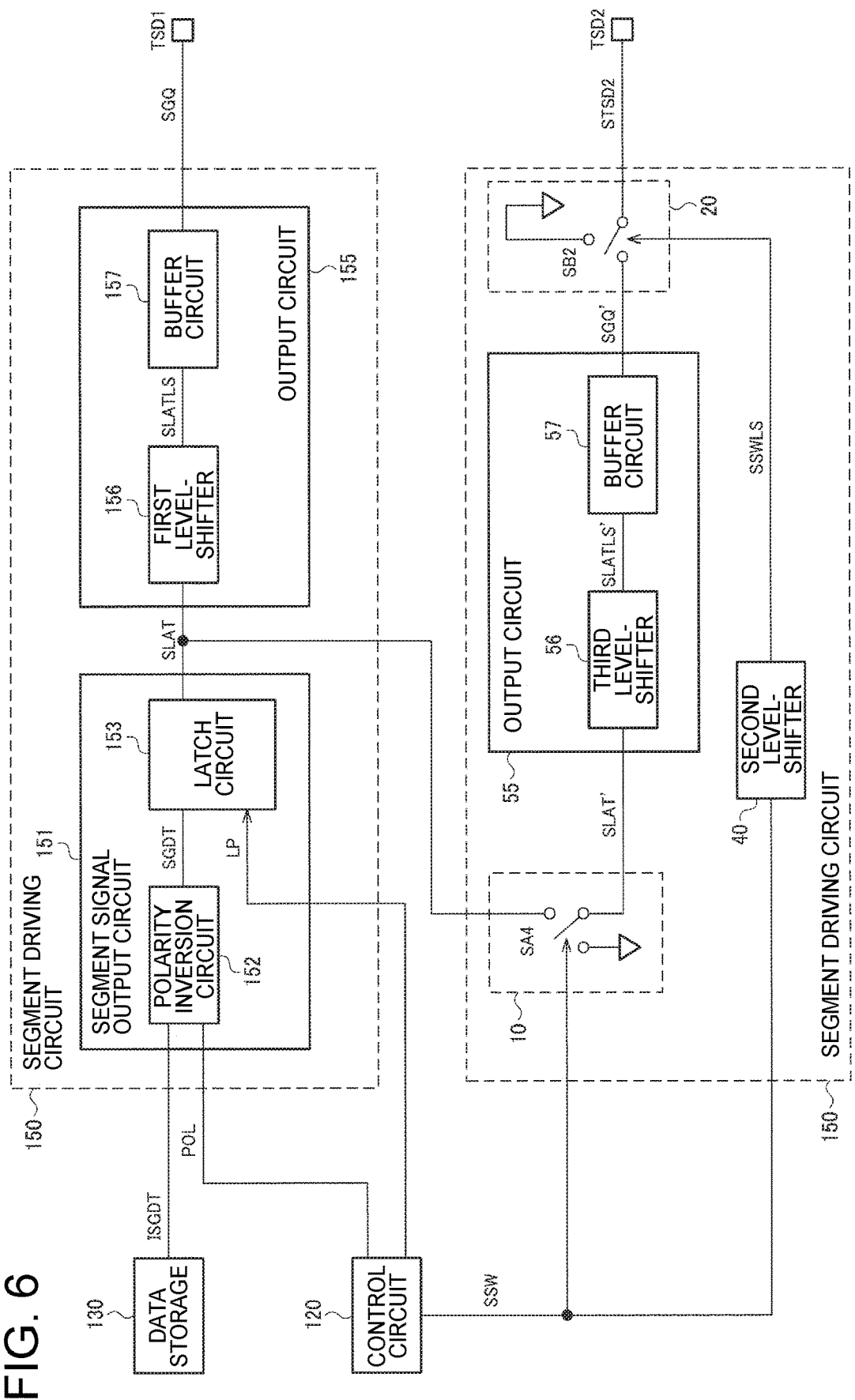
FIG. 6 is a first detailed exemplary configuration of a segment driving circuit.

FIG. 6 is a first detailed exemplary configuration of the segment driving circuit 150.

The segment terminals TSD1 and TSD2 are connected to one segment electrode ESD1, as shown in FIG. 1. With this, the segment driving circuit 150 is set to a first mode. That is, in the first mode, the segment driving circuit 150 drives the segment electrode ESD1 through the segment terminal TSD1 and the segment terminal TSD2.

Alternatively, only the segment terminal TSD1, of the segment terminals TSD1 and TSD2, may be connected to a segment electrode. One segment signal line is connected to the segment electrode, and the segment terminal TSD1 is connected to the segment signal line. With this, the segment driving circuit 150 is set to a second mode. That is, in the second mode, the segment driving circuit 150 drives the segment electrode through the segment terminal TSD1.

In this way, the segment driving circuit 150 can drive both of a segment electrode to which two segment signal lines are connected and a segment electrode to which one segment signal line is connected. A user can select whether both of the segment terminals TSD1 and TSD2 are to be connected to a segment electrode or only the segment terminal TSD1 is to be connected to the segment electrode in accordance with the design for determining the arrangement of important icons in the liquid crystal panel 200, for example.

The segment driving circuit 150 includes a segment signal output circuit 151, an output circuit 155, an output circuit 55, switch circuits 10 and 20, and a second level shifter 40.

The segment signal output circuit 151 outputs a segment signal SLAT based on a segment driving data ISGDT. Specifically, the segment signal output circuit 151 includes a polarity inversion circuit 152 and a latch circuit 153.

When a voltage is to be applied to a liquid crystal cell corresponding to the segment electrode ESD1, the segment driving data ISGDT is at a high level, and when a voltage is not to be applied to the liquid crystal cell, the segment driving data ISGDT is at a low level. The polarity inversion circuit 152 performs processing to invert the polarity of the segment driving data ISGDT based on a polarity signal POL input from the control circuit 120. That is, the polarity inversion circuit 152 outputs an output signal SGDT at the same logic level as the segment driving data ISGDT in a positive polarity frame, and outputs an output signal SGDT obtained by inverting the logic level of the segment driving data ISGDT in a negative polarity frame.

The latch circuit 153 latches the output signal SGDT by a latch pulse LP input from the control circuit 120, and outputs the latched signal as the segment signal SLAT.

The output circuit 155 outputs a segment driving signal SGQ based on the segment signal SLAT. Specifically, the output circuit 155 includes a first level shifter 156 and a buffer circuit 157.

The first level shifter 156 outputs an output signal SLATLS by level-shifting the segment signal SLAT. The control circuit 120, the data storage 130, and the segment signal output circuit 151 operate with a first power supply voltage, and the buffer circuit 157 operates with a second power supply voltage that is different from the first power supply voltage. That is, the first level shifter 156 level-shifts the signal level at the first power supply voltage to a signal level at the second power supply voltage. For example, the second power supply voltage is higher than the first power supply voltage.

The buffer circuit 157 outputs the segment driving signal SGQ based on the output signal SLATLS of the first level shifter 156. That is, the buffer circuit 157 outputs the segment driving signal SGQ by buffering the output signal SLATLS. If the circuit properly operates, the logic level of the segment signal SLAT is the same as the logic level of the segment driving signal SGQ.

A segment signal SLAT' is input to the output circuit 55 from a switch circuit 10. The output circuit 55 outputs a segment driving signal SGQ' based on the segment signal SLAT'. Specifically, the output circuit 55 includes a third level shifter 56 and a buffer circuit 57.

The operations of the output circuit 55 are similar to the operations of the output circuit 155. That is, the third level shifter 56 level-shifts the segment signal SLAT'. The buffer circuit 57 outputs the segment driving signal SGQ' based on an output signal SLATLS' of the third level shifter 56.

The switch circuit 10 includes a switch SA4. The switch SA4 is controlled to be in the first or second mode by a switch control signal SSW. In the first mode, the switch SA4 selects SLAT'=SLAT. In the second mode, the switch SA4 selects SLAT'=L. "L" indicates a low level. The switch SA4 is constituted by transistors, for example.

The second level shifter 40 level-shifts the switch control signal SSW, and outputs a switch control signal SSWLS subjected to level shifting. The second level shifter 40 level-shifts the signal level at the first power supply voltage to a signal level at the second power supply voltage.

The switch circuit 20 includes a switch SB2. The switch SB2 is controlled to be in the first or second mode by the switch control signal SSWLS. STSD2 is a signal output from the segment terminal TSD2 by the segment driving circuit 150. In the first mode, the switch SB2 selects STSD2=SGQ'. In the second mode, the switch SB2 selects STSD2=L. The switch SB2 is constituted by transistors, for example.

Figure 7:
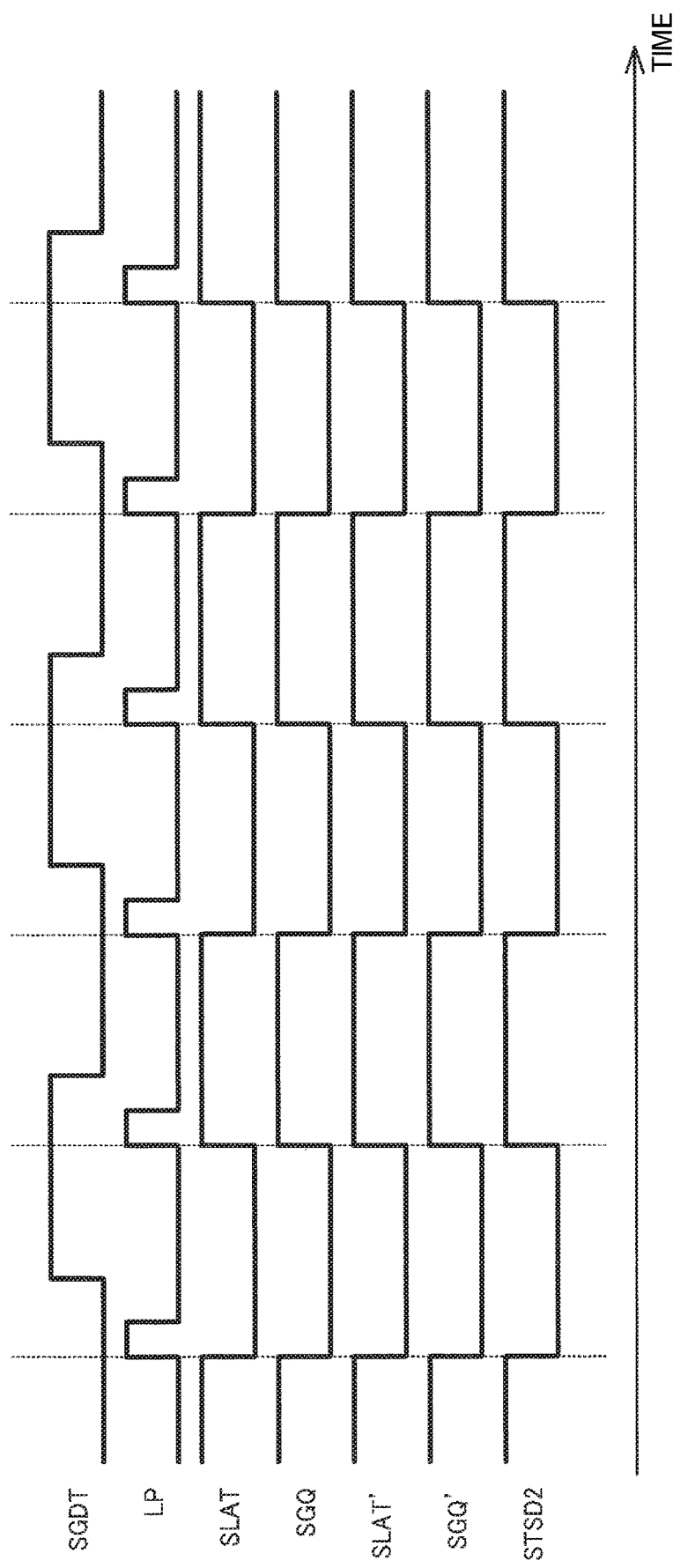
FIG. 7 shows exemplary signal waveforms of the segment driving circuit in a first mode.

FIG. 7 shows exemplary signal waveforms of the segment driving circuit 150 in the first mode. The latch circuit 153 outputs the segment signal SLAT by latching the output signal SGDT of the polarity inversion circuit 152 at a rising edge of the latch pulse LP. The output circuit 155 outputs the segment driving signal SGQ based on the segment signal SLAT. The segment signal SLAT'=SLAT is input to the output circuit 55. The output circuit 55 outputs the segment driving signal SGQ' at the same signal level as the segment driving signal SGQ based on the segment signal SLAT'. The signal STSD2=SGQ' is output from the segment terminal TSD2.

As described above, in the first mode, the segment driving circuit 150 outputs the segment driving signal SGQ to the segment terminal TSD1, and outputs the segment driving signal SGQ' at the same signal level as the segment driving signal SGQ to the segment terminal TSD2.

Figure 8:
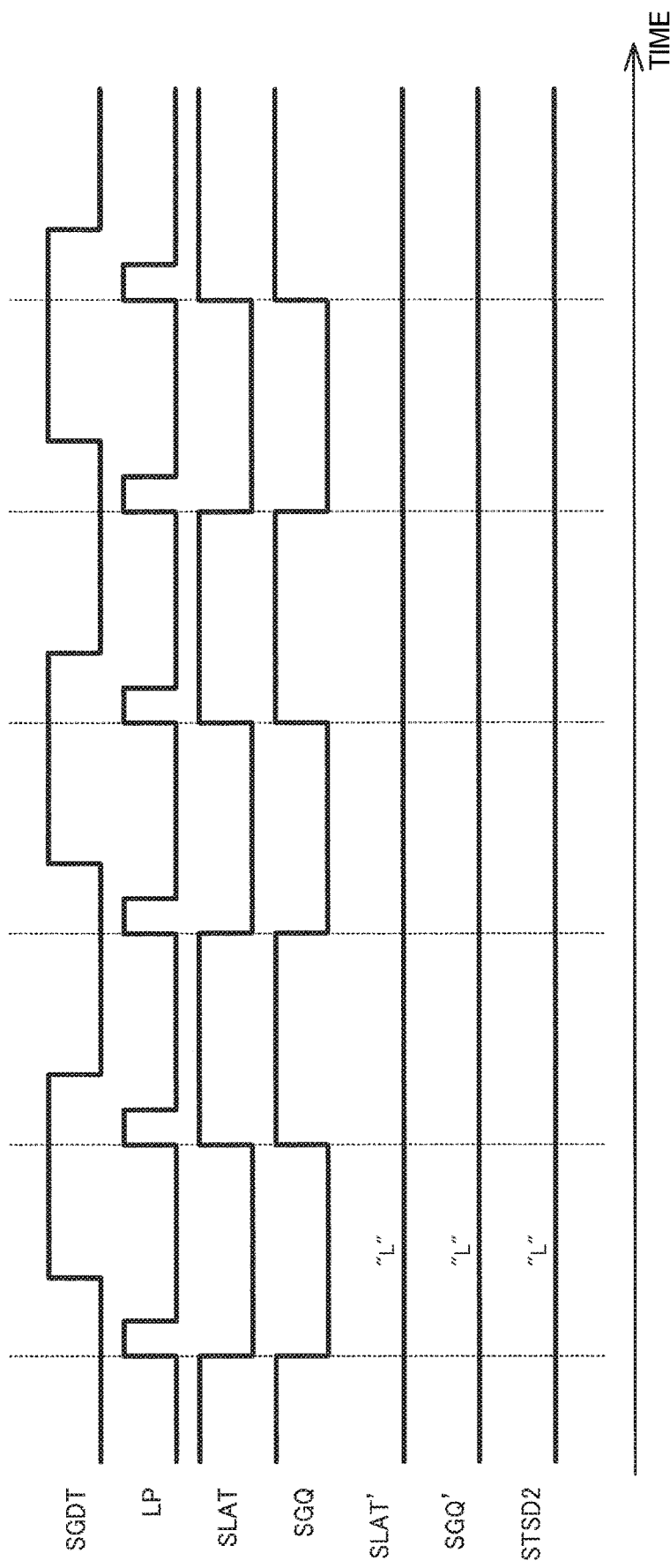
FIG. 8 shows exemplary signal waveforms of the segment driving circuit in a second mode.

FIG. 8 shows exemplary signal waveforms of the segment driving circuit 150 in the second mode. The output circuit 155 outputs the segment driving signal SGQ by operating similarly to the operations shown in FIG. 7. The segment signal SLAT'=L is input to the output circuit 55, and therefore the output circuit 55 outputs the segment driving signal SGQ'=L. The signal STSD2=L is output from the segment terminal TSD2.

As described above, in the second mode, the segment driving circuit 150 outputs the segment driving signal SGQ to the segment terminal TSD1, and fixes the segment terminal TSD2 at a low level. As described above, when the second mode is used, the segment terminal TSD2 is not connected to the segment signal line, and the segment terminal TSD2 is in an open state. That is, in the second mode, the segment driving signal is output from the segment terminal TSD1 that is connected to the segment signal line, and the segment terminal TSD2 in an open state is fixed at a low level.

Note that, a portion, of the segment driving circuit 150, that is to be connected to the segment terminals TSD1 and TSD2 has been described above, but the segment driving circuits are similarly connected to other segment terminals, respectively. Specifically, segment driving circuits configured similarly to those shown in FIG. 6 are connected to two segment terminals that are to be connected to one segment electrode, such as TSD3 and TSD4. When one segment terminal is connected to one segment electrode such as TSS1, a circuit similar to the segment signal output circuit 151 and the output circuit 155 in FIG. 6 is connected to the one segment terminal.

Figure 9:
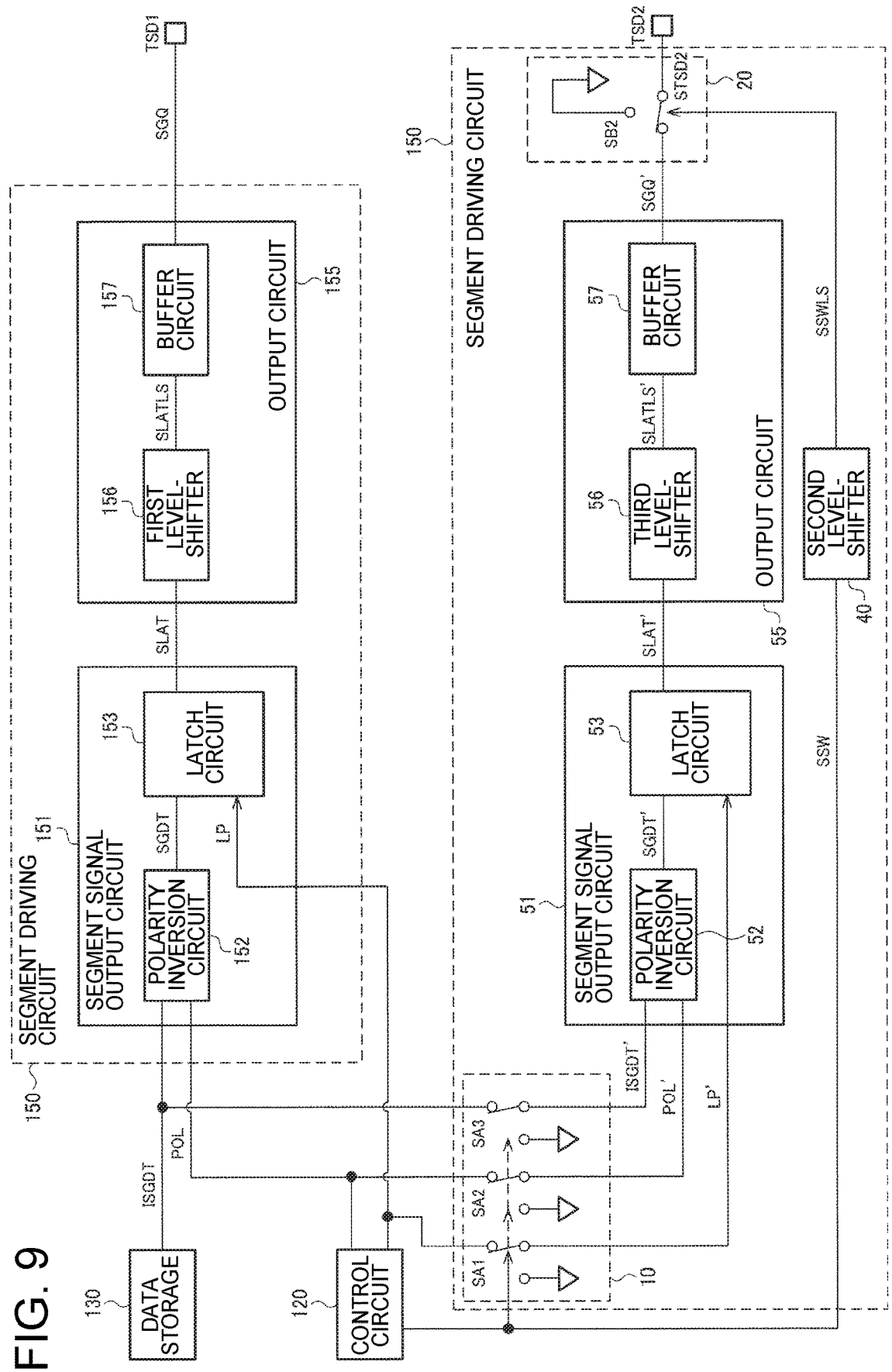
FIG. 9 is a second detailed exemplary configuration of the segment driving circuit.

A second detailed exemplary configuration of the segment driving circuit 150 is shown in FIG. 9. Note that the constituent elements that are the same as the constituent elements that have already been described will be denoted by the same reference signs, and the description thereof will be omitted, as appropriate.

In FIG. 9, the segment driving circuit 150 includes a segment signal output circuit 51, and the segment signal output circuit 51 outputs a segment signal SLAT' to an output circuit 55.

Specifically, the segment signal output circuit 51 includes a polarity inversion circuit 52 and a latch circuit 53. The segment signal output circuit 51 operates similarly to the segment signal output circuit 151. That is, a polarity signal POL' and a segment driving data ISGDT' are input to the polarity inversion circuit 52 from a switch circuit 10. The polarity inversion circuit 52 performs processing to invert the polarity of the segment driving data ISGDT', based on the polarity signal POL'. A latch pulse LP' is input to the latch circuit 53 from the switch circuit 10. The latch circuit 53 latches the output signal SGDT' of the polarity inversion circuit 52 by the latch pulse LP', and outputs the latched signal as the segment signal SLAT'.

The switch circuit 10 includes switches SA1 to SA3. The switches SA1 to SA3 are controlled to be in the first or second mode. In the first mode, the switch SA1 selects LP'=LP, the switch SA2 selects POL'=POL, and the switch SA3 selects ISGDT'=ISGDT. In the second mode, the switch SA1 selects LP'=L, the switch SA2 selects POL'=L, and the switch SA3 selects ISGDT'=L. The switches SA1 to SA3 are each constituted by transistors, for example. The signal waveforms in the second detailed exemplary configuration are similar to those shown in FIGS. 7 and 8.

Figure 10:
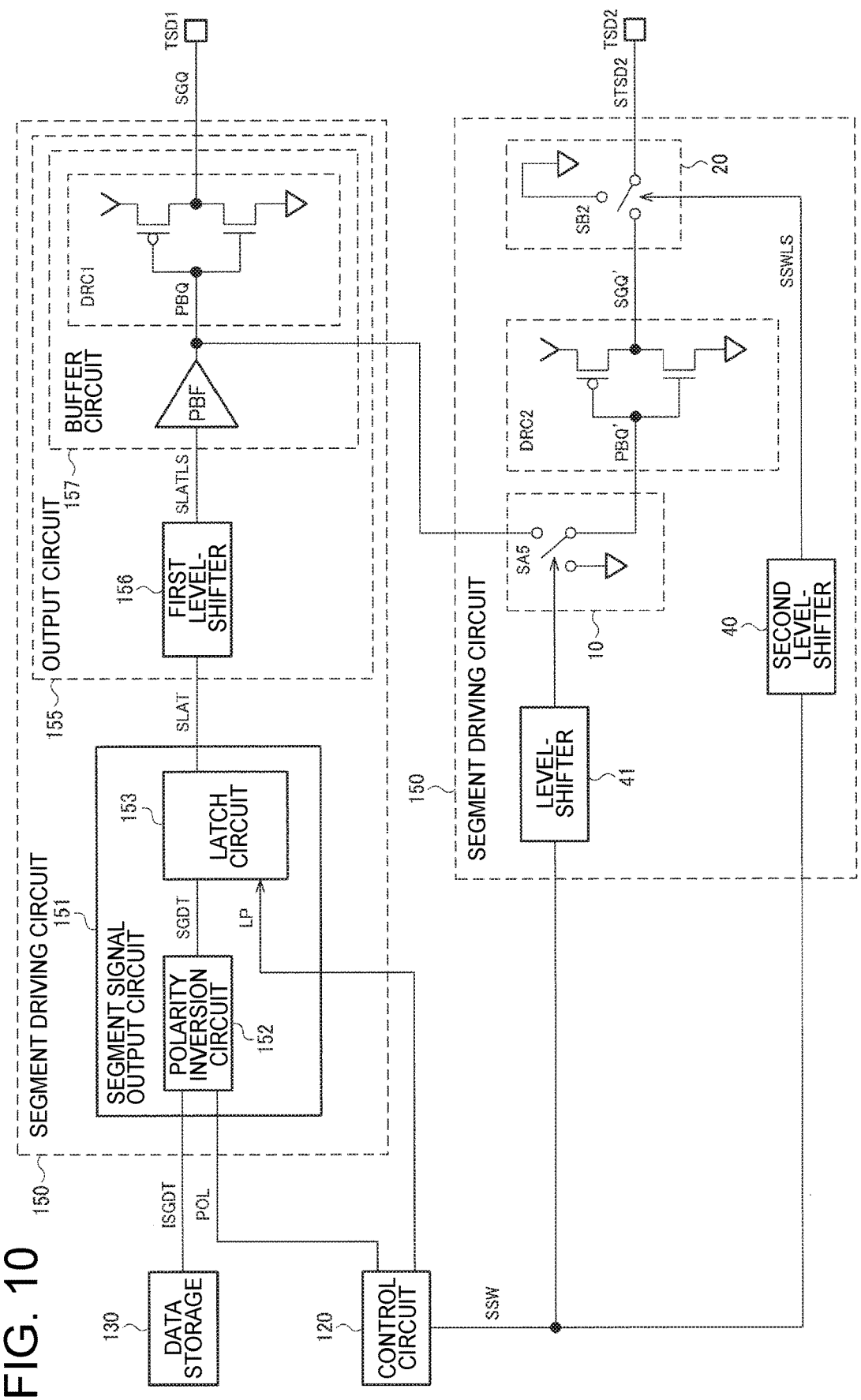
FIG. 10 is a third detailed exemplary configuration of the segment driving circuit.

FIG. 10 is a third detailed exemplary configuration of the segment driving circuit. In FIG. 10, the segment driving circuit 150 includes a segment signal output circuit 151, an output circuit 155, a second level shifter 40, a level-shifter 41, switch circuits 10 and 20, and an output driver DRC2. Also, a buffer circuit 157 of the output circuit 155 includes a pre-buffer PBF and an output driver DRC1. Also, the switch circuit 10 is configured to switch an input signal PBQ' to the output driver DRC2. Note that the constituent elements that are the same as the constituent elements that have already been described will be denoted by the same reference signs, and the description thereof will be omitted, as appropriate.

The pre-buffer PBF drives the output driver DRC1 by buffering the output signal SLATLS of the first level shifter 156. Also, in the first mode, the pre-buffer PBF drives the output drivers DRC1 and DRC2. The output driver DRC1 outputs the segment driving signal SGQ based on an output signal PBQ of the pre-buffer PBF. The output driver DRC2 outputs the segment driving signal SGQ' based on the input signal PBQ' selected by the switch circuit 10. The output drivers DRC1 and DRC2 are drivers configured to be an inverter formed by a P-type transistor and an N-type transistor.

The switch circuit 10 includes a switch SA5. The level-shifter 41 level-shifts a switch control signal SSW, and output a switch control signal subjected to level-shifting to the switch SA5. The level-shifter 41 level-shifts the signal level at the first power supply voltage to a signal level at the second power supply voltage. Note that the level-shifter 40 may output a switch control signal SSWLS to the switch SA5 without providing the level-shifter 41. In the first mode, the switch SA5 selects PBQ'=PBQ. In the second mode, the switch SA5 selects PBQ'=L. The signal waveforms in the third detailed exemplary configuration are similar to those of SGDT, LP, SLAT, SGQ, SGQ', and STSD2 in FIGS. 7 and 8.

Figure 11:
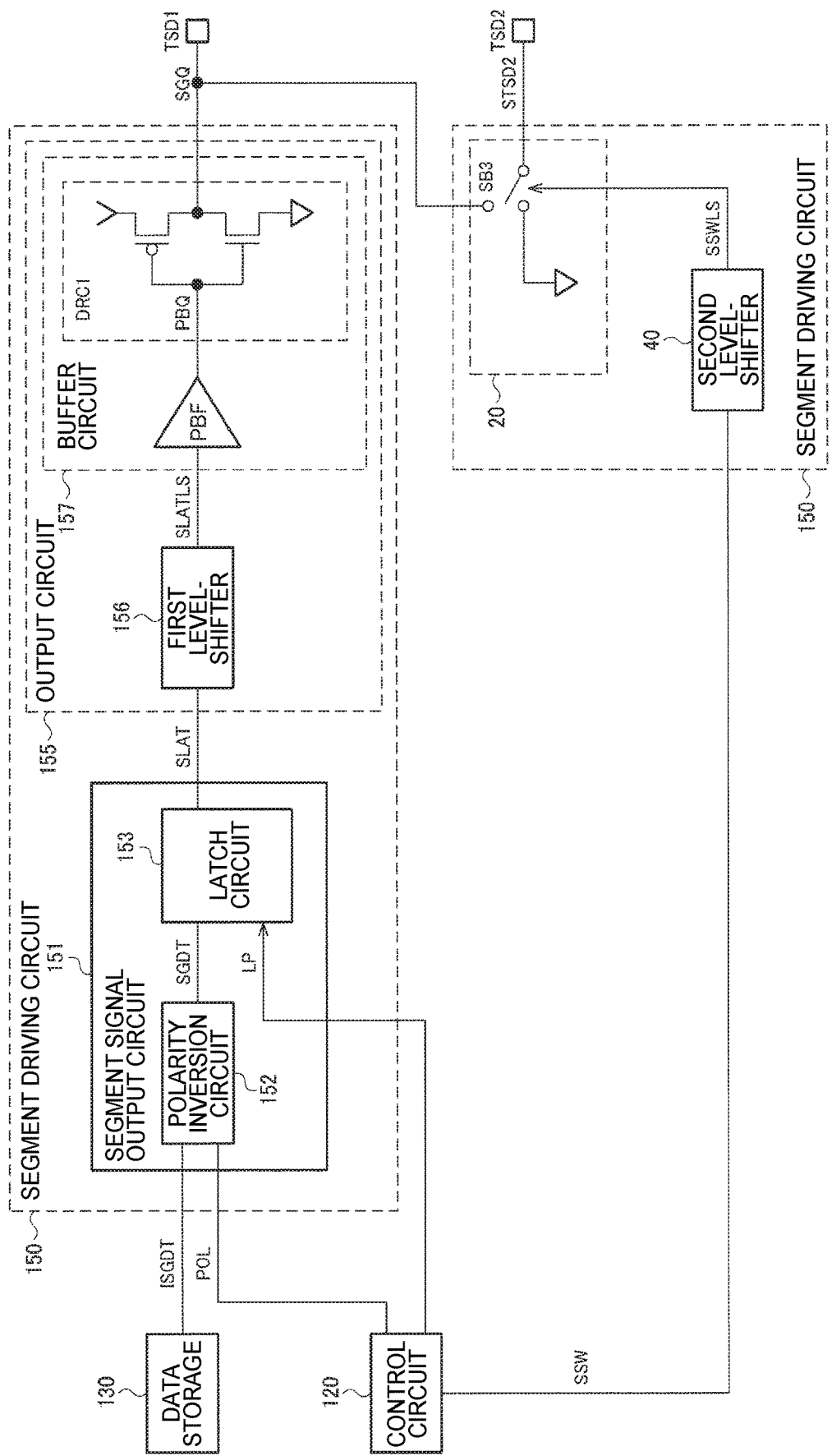
FIG. 11 is a fourth detailed exemplary configuration of the segment driving circuit.

FIG. 11 is a fourth detailed exemplary configuration of the segment driving circuit 150. In the first to third detailed exemplary configurations described above, in the first mode, the segment driving circuit 150 outputs the segment driving signal SGQ' at the same signal level as the segment driving signal SGQ to the segment terminal TSD2. In the fourth detailed exemplary configuration, in the first mode, the segment driving circuit 150 outputs the segment driving signal SGQ to the segment terminal TSD2. Note that the constituent elements that are the same as the constituent elements that have already been described will be denoted by the same reference signs, and the description thereof will be omitted, as appropriate.

In FIG. 11, the segment driving circuit 150 includes a segment signal output circuit 151, an output circuit 155, a second level shifter 40, and a switch circuit 20. The switch circuit 20 includes a switch SB3. In the first mode, the switch SB3 selects STSD2=SGQ. In the second mode, the switch SB3 selects STSD2=L. The signal waveforms in the fourth detailed exemplary configuration are similar to those of SGDT, LP, SLAT, SGQ, and STSD2 in FIGS. 7 and 8.

5. Second Detailed Exemplary Configuration of Liquid Crystal Driver

Figure 12:
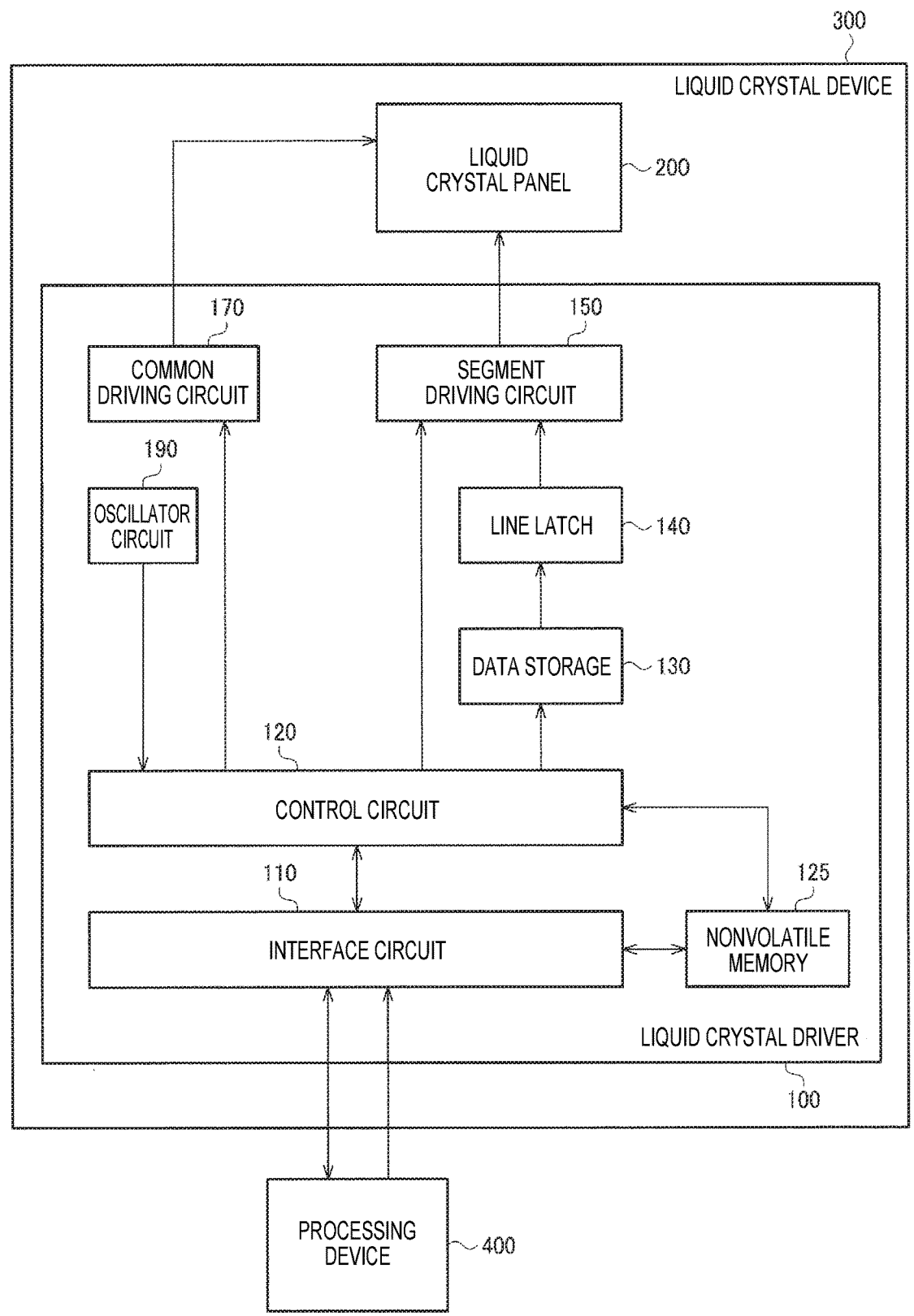
FIG. 12 is a second detailed exemplary configuration of the liquid crystal driver.

FIG. 12 is a second detailed exemplary configuration of the liquid crystal driver 100. The liquid crystal driver 100 includes an interface circuit 110, a control circuit 120, a data storage 130, the line latch 140, a common driving circuit 170, an oscillator circuit 190, and a nonvolatile memory 125. Note that the constituent elements that are the same as the constituent elements that have already been described will be denoted by the same reference signs, and the description thereof will be omitted, as appropriate.

The nonvolatile memory 125 stores a setting value for setting the segment driving circuit 150 to the first or second mode. The segment driving circuit 150 is set to the first or second mode based on the setting value stored in the nonvolatile memory 125. For example, the setting value is written into the nonvolatile memory 125 when the liquid crystal device 300 is manufactured. Also, when the liquid crystal driver 100 is activated or the like, the control circuit 120 reads out the setting value from the nonvolatile memory 125, and sets the segment driving circuit 150 to the first or second mode.

Note that the liquid crystal driver 100 may include a register. The register may store the setting value for setting the segment driving circuit 150 to the first or second mode. In this case, the segment driving circuit 150 is set to the first or second mode based on the setting value stored in the register. The setting value is transmitted from the processing device 400 to the liquid crystal driver 100. That is, the interface circuit 110 receives the setting value from the processing device 400, and writes the setting value into the register. The control circuit 120 sets the segment driving circuit 150 to the first or second mode based on the setting value written into the register.

In the following, a set of two segment terminals that can be connected to one segment electrode is referred to as one set of segment terminals. For example, TSD1 and TSD2 that are described in FIG. 6 and the like are one set of segment terminals.

The liquid crystal driver 100 can include a plurality of sets of segment terminals. In the following, the liquid crystal driver 100 is assumed to include first to $n^{th}$ sets of segment terminals. Also, the segment driving circuit 150 is assumed to include first to $n^{th}$ segment driving circuits that respectively output segment driving signals to the first to $n^{th}$ sets of segment terminals. n is an integer of two or more. The first to $n^{th}$ sets of segment terminals are arranged in the region HAR3 in FIG. 4, for example.

Various methods for setting the mode can be envisioned, which include following first to fourth methods, for example.

In the first method, a setting value for setting all of the first to $n^{th}$ segment driving circuits to the same mode is stored in the nonvolatile memory 125 or the register. The control circuit 120 collectively sets the first to $n^{th}$ segment driving circuits to the first or second mode based on the setting value.

In the second method, setting values for individually setting the first to $n^{th}$ segment driving circuits to the first or second mode are stored in the nonvolatile memory 125 or the register. That is, the setting values include first to $n^{th}$ setting values for respectively setting the modes of the first to $n^{th}$ segment driving circuits. The control circuit 120 sets the first segment driving circuit to the first or second mode based on the first setting value. Similarly, the control circuit 120 sets the second to $n^{th}$ segment driving circuits to the first or second mode based on the second to $n^{th}$ setting values, respectively.

In the third method, the first to $n^{th}$ sets of segment terminals are divided into first to $m^{th}$ groups. Assume that the first to $n^{th}$ sets of segment terminals are sequentially arranged along the long side direction of the liquid crystal driver 100. For example, when n=32 is assumed, the first to 32th sets of segment terminals may be divided into eight groups of segment terminals, namely a first group of the first to fourth sets of segment terminals, a second group of the fifth to eighth sets of segment terminals, and so on. Note that this is merely an example, and the numbers of sets belonging to the respective groups need not to be the same.

The segment driving circuits for the respective first to $m^{th}$ groups are segment driving circuits respectively corresponding to the first to $m^{th}$ groups of segment terminals. Setting values for respectively setting the segment driving circuits for the first to $m^{th}$ groups to the first or second mode are stored in the nonvolatile memory 125 or the register. m is an integer of two or more and n−1 or less. The setting values include first to $m^{th}$ setting values for respectively setting the modes of the segment driving circuits for the first to $m^{th}$ groups. The control circuit 120 sets the segment driving circuit for the first group to the first or second mode based on the first setting value. Similarly, the control circuit 120 sets the segment driving circuits for the second to $m^{th}$ groups to the first or second mode based on the second to $m^{th}$ setting values, respectively.

In the fourth method, the range of sets, of the first to $n^{th}$ sets of segment terminals, that are to be set to the first mode is set. Assume that the first to $n^{th}$ sets of segment terminals are sequentially arranged along the long side direction of the liquid crystal driver 100. Here, $i^{th}$ to $j^{th}$ segment driving circuits corresponding to $i^{th}$ to $j^{th}$ sets of segment terminals are set to the first mode based on the setting value. First to $i-1^{th}$ segment driving circuits and $j+1^{th}$ to $n^{th}$ segment driving circuits are set to the second mode.

6. Liquid Crystal Panel

Figure 13:
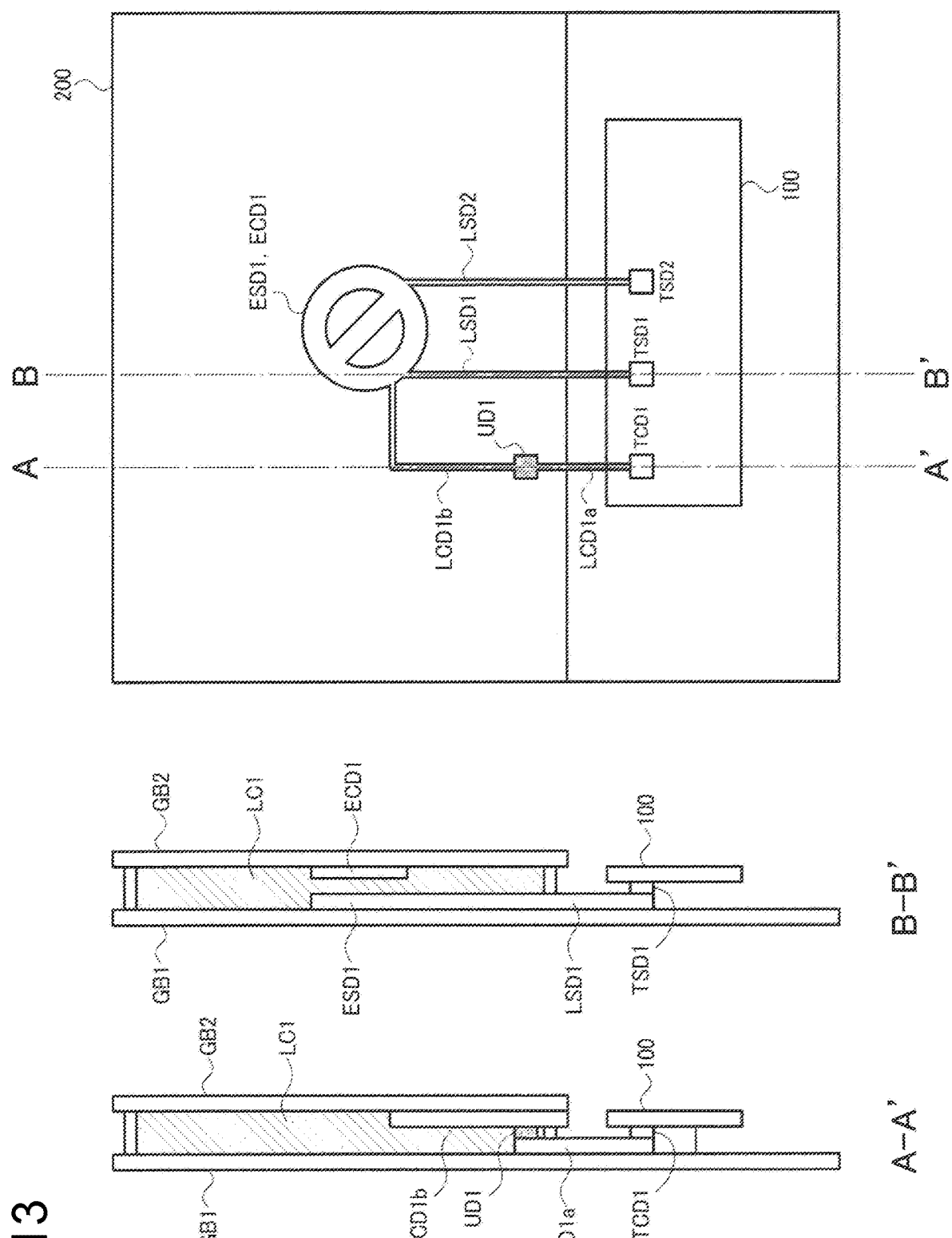
FIG. 13 is a detailed exemplary configuration of a liquid crystal panel.

FIG. 13 is a detailed exemplary configuration of the liquid crystal panel 200. FIG. 13 shows a plan view of the liquid crystal panel 200, a cross-sectional view taken along line A-A' in the plan view, and a cross-sectional view taken along line B-B' in the plan view. In FIG. 13, only the constituent elements related to the segment electrode ESD1 are shown.

The liquid crystal panel 200 includes glass substrates GB1 and GB2, the segment electrode ESD1, the segment signal lines LSD1 and LSD2, the common electrode ECD1, signal lines LCD1a and LCD1b, and a vertical conductive material UD1.

The glass substrate GB1 and the glass substrate GB2 face each other, and transparent conductive films and liquid crystal are provided therebetween. The liquid crystal driver 100 is mounted on the glass substrate GB1 at a portion that is not covered by the glass substrate GB2.

The segment electrode ESD1 and the segment signal lines LSD1 and LSD2, which are transparent conductive films, are formed on the glass substrate GB1. The segment terminals TSD1 and TSD2 are respectively connected to ends, on one side, of the segment signal lines LSD1 and LSD2. A portion, of the transparent conductive films formed on the glass substrate GB1, for applying a voltage to the liquid crystal LC1 with the common electrode ECD1 is the segment electrode ESD1. That is, the segment electrode ESD1 and the common electrode ECD1 are arranged so as to face each other, and the liquid crystal LC1 is provided therebetween.

The signal line LCD1a, which is a transparent conductive film, is formed on the glass substrate GB1. The common terminal TCD1 is connected to one end of the signal line LCD1a. The signal line LCD1b and the common electrode ECD1, which are transparent conductive films, are formed on the glass substrate GB2. The other end of the signal line LCD1a and one end of the signal line LCD1b are connected by a vertical conductive material UD1. The other end of the signal line LCD1b is connected to the common electrode ECD1. In FIG. 2, the common signal lines are illustrated only as transparent conductive films, but in FIG. 13, the common signal line includes transparent conductive films and a vertical conductive material. That is, the common signal line that connects the common terminal TCD1 and the common electrode ECD1 includes the signal lines LCD1a and LCD1b and the vertical conductive material UD1.

In this way, the common signal lines may include a conductor other than transparent conductive films. Similarly, the segment signal lines may include a conductor other than transparent conductive films.

7. Various embodiments

Various embodiments that have not been described above will be described in the following.

In the exemplary signal waveforms in FIGS. 7 and 8 described above, a case where the voltages applied to the respective segment electrodes do not change during one frame, in static driving, has been described as an example. However, the driving method is not limited thereto, and PWM driving in which the voltages applied to the respective segment electrodes change midway in one frame, in static driving, may be performed.

An example in which the number of tones is eleven will be described. In PWM driving in static driving, the transmittance of liquid crystal takes two values, namely 0% and 100%. The tones can be realized, in time average, by changing the duty of the period in which the transmittance is 100%. The tones in time average are referred to as 100% tone, 90% tone, and so on, and 0% tone. The control circuit 120 outputs a latch pulse including 10 pulses in one frame at equal intervals to the segment driving circuit 150. The number of pulses is a number obtained by subtracting one from the number of tones. At 100% tone, the segment driving signal is at a high level from a first latch pulse in a positive polarity frame to a first latch pulse in the next negative polarity frame. At 90% tone, the segment driving signal is at a high level from a second latch pulse in the positive polarity frame to a second latch pulse in the next negative polarity frame. The same applies to the other tones, and at 0% tone, the segment driving signal is at a high level from a tenth latch pulse in the positive polarity frame to a tenth latch pulse in the next negative polarity frame.

Figure 14:
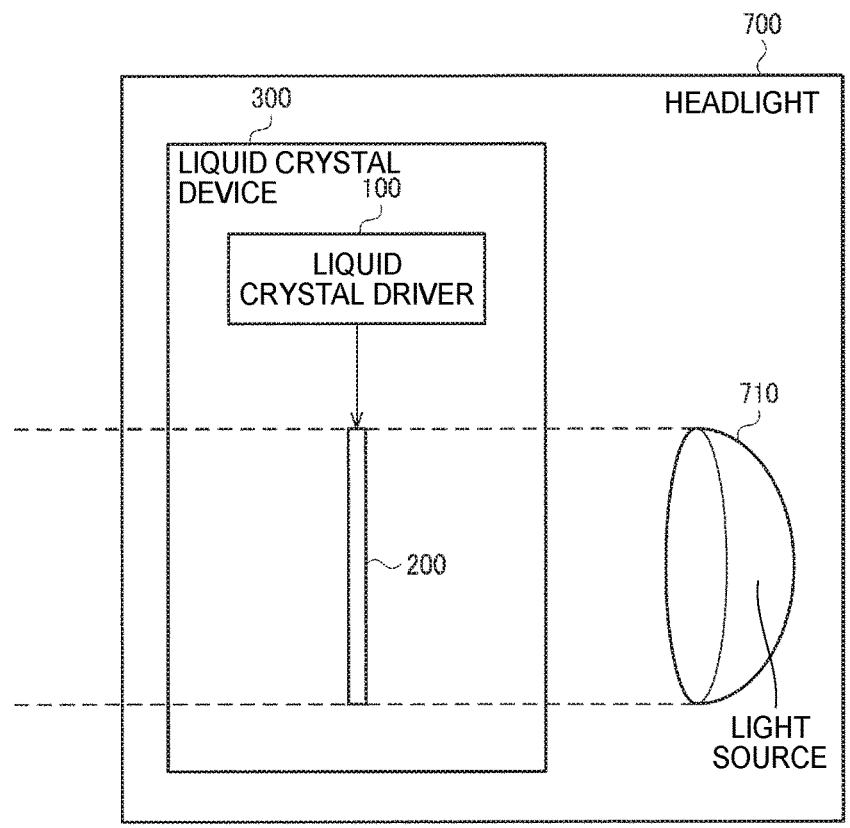
FIG. 14 is an exemplary configuration of a headlight.
Figure 15:
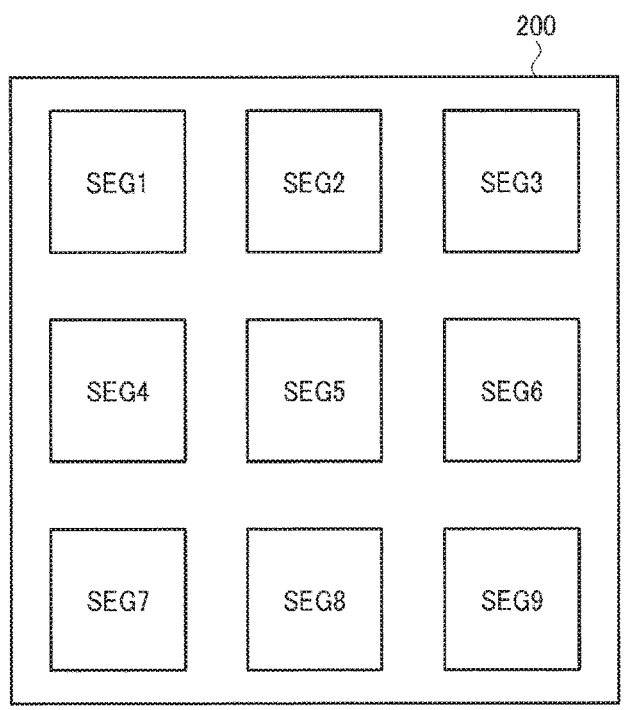
FIG. 15 is an example of the liquid crystal panel that is applied to the headlight.

In FIGS. 1 to 13, a case where the liquid crystal device 300 is a display device has been described as an example, but the liquid crystal device 300 is not limited to the display device. For example, the liquid crystal device 300 may be a liquid crystal shutter that controls transmission and blocking of light. A headlight is an example of the device to which the liquid crystal shutter can be applied. FIG. 14 is an exemplary configuration of a headlight 700 including the liquid crystal device 300. Also, FIG. 15 shows an example of the liquid crystal panel 200 to be applied to the headlight.

The headlight 700 includes the liquid crystal device 300 and a light source 710. The light source 710 is an LED (Light Emitting Diode). Alternatively, the light source 710 may be a halogen lamp or a Xenon lamp. The liquid crystal device 300 includes the liquid crystal driver 100 and the liquid crystal panel 200.

A plurality of segments SEG1 to SEG9 are provided in the liquid crystal panel 200. The segments SEG1 to SEG9 are each a liquid crystal cell. The segments SEG1 to SEG9 are arranged in a 3×3 matrix, for example, but the arrangement is not limited thereto. Note that illustration of the segment signal lines and the common signal lines are omitted in FIG. 15.

The liquid crystal driver 100 controls turning on or off of each of the segments SEG1 to SEG9. Here, "being turned on" means a transmissive state, and "being turned off" means a blocking state. The light source 710 emits light toward the liquid crystal panel 200, the light passes through the liquid crystal cells that are turned on, and the light is emitted toward an object to be illuminated by the headlight 700. The liquid crystal cells that are turned off block the light from the light source 710. That is, each of the segments SEG1 to SEG9 functions as a shutter. The light distribution of the headlight 700 changes in accordance with the on/off state of the segments SEG1 to SEG9. For example, as a result of the liquid crystal driver 100 turning off the segments SEG1 to SEG3 and turning on the segments SEG4 to SEG9, a so-called low beam can be realized. Also, as a result of the liquid crystal driver 100 turning on the segments SEG1 to SEG9, a so-called high beam can be realized.

Note that the application example of the liquid crystal shutter is not limited to the headlight. For example, a liquid crystal device including the liquid crystal shutter may be combined with an active matrix type display device. In this case, a segment is provided in a liquid crystal panel of the liquid crystal device so as to cover the screen of the active matrix type display device, and the segment function as a liquid crystal shutter. Segments corresponding to various display items may be provided in the liquid crystal panel other than the segment that functions as the liquid crystal shutter. The liquid crystal device and the active matrix type display device are arranged such that a user views the active matrix type display device through the liquid crystal shutter. Also, as a result of the liquid crystal driver 100 turning on the liquid crystal shutter, the user can view the display of the active matrix type display device through the liquid crystal shutter. Also, as a result of the liquid crystal driver 100 turning off the liquid crystal shutter, the display of the active matrix type display device is blocked by the liquid crystal shutter, and the user cannot view the display.

8. Electronic Apparatus and Mobile Body

Figure 16:
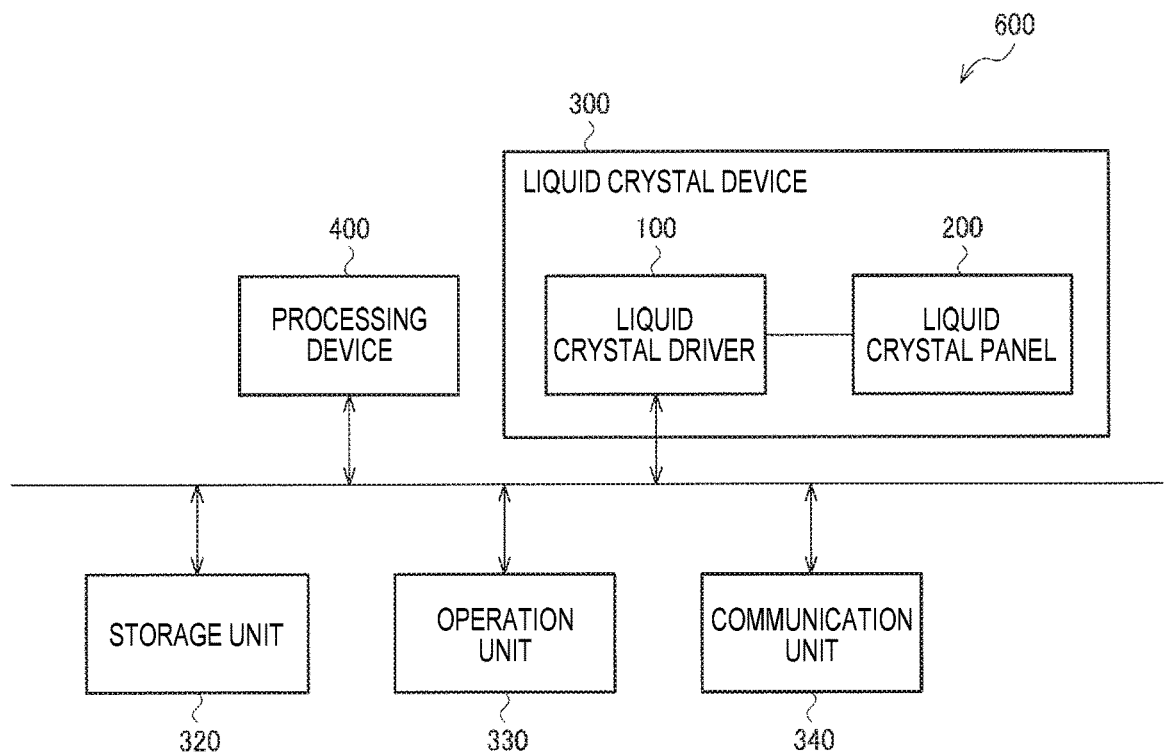
FIG. 16 is an exemplary configuration of an electronic apparatus.

FIG. 16 is an exemplary configuration of an electronic apparatus 600 including the liquid crystal device 300 of the present embodiment. Various electronic apparatuses on which the display device is mounted can be envisioned as the electronic apparatus of the present embodiment. For example, an on-board display device, a display, a projector, a television device, an information processing device, a mobile information terminal, a car navigation system, a mobile game terminal, and a DLP (Digital Light Processing) device can be envisioned as the electronic apparatus of the present embodiment. The on-board display device is a cluster panel or the like. The cluster panel is a display panel that is provided in front of the driver's seat and in which a meter and the like are displayed.

The electronic apparatus 600 includes a processing device 400, a liquid crystal device 300, a storage unit 320, an operation unit 330, and a communication unit 340. The liquid crystal device 300 includes the liquid crystal driver 100 and the liquid crystal panel 200. Note that the storage unit 320 is a storage device or a memory. The operation unit 330 is an operation device. The communication unit 340 is a communication device.

The operation unit 330 is a user interface for receiving various operations made by a user. The operation unit 330 is constituted by a button, a mouse, a keyboard, and a touch panel attached to the liquid crystal panel 200, for example. The communication unit 340 is a data interface for performing communication of image data and control data. The communication unit 340 is a wired communication interface such as a USB or a wireless communication interface such as a wireless LAN, for example. The storage unit 320 stores image data input from the communication unit 340. Alternatively, the storage unit 320 functions as a working memory of the processing device 400. The processing device 400 performs processing to control the units of the electronic apparatus, and various types of data processing. The processing device 400 converts the format of image data received by the communication unit 340 or image data stored in the storage unit 320 to a format that the liquid crystal driver 100 can accept, and outputs the converted image data to the liquid crystal driver 100. The liquid crystal driver 100 drives the liquid crystal panel 200 based on the image data transferred from the processing device 400.

Figure 17:
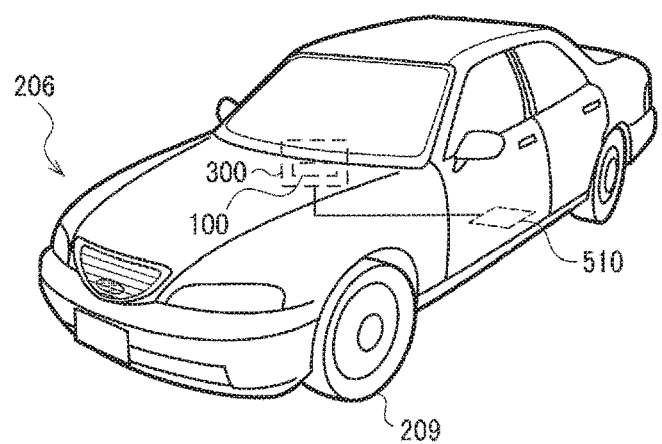
FIG. 17 is an exemplary configuration of a mobile body.

FIG. 17 is an exemplary configuration of a mobile body including the liquid crystal device 300 of the present embodiment. The mobile body is an apparatus or device that includes a drive mechanism such as an engine or a motor, steering mechanisms such as a steering wheel or a rudder, and various electronic apparatus, for example, and moves on the ground, in the air, and on the sea. Various types of mobile bodies such as a car, an airplane, a motorcycle, a ship, a mobile robot, and a walking robot can be envisioned as the mobile body of the present embodiment, for example. FIG. 17 schematically illustrates an automobile 206 serving as a specific example of the mobile body. The liquid crystal device 300 including the liquid crystal driver 100 and a control device 510 that controls the units of the automobile 206 are incorporated into the automobile 206. The control device 510 creates an image that shows pieces of information such as speed, remaining fuel amount, travel distance, and settings of various types of devices to a user, and transmits the image to the liquid crystal device 300 for causing the liquid crystal device 300 to display the image.

The liquid crystal device described above includes a liquid crystal panel and a liquid crystal driver that drives the liquid crystal panel. The liquid crystal panel includes a first segment electrode, a first segment signal line connected to the first segment electrode, and a second segment signal line connected to the first segment electrode. The liquid crystal driver includes a first segment terminal to be connected to the first segment signal line, a second segment terminal to be connected to the second segment signal line, and a segment driving circuit. The segment driving circuit outputs a first segment driving signal to the first segment signal line through the first segment terminal, and outputs a second segment driving signal to the second segment signal line through the second segment terminal.

In this way, even if an anomaly in the first segment driving signal output from the first segment terminal, a contact failure at the first segment terminal, or an anomaly in the first segment signal line has occurred, since the second segment driving signal is output from the second segment terminal to the second segment signal line, the driving of the first segment electrode can be continued.

Also, in the present embodiment, the first segment signal line and the second segment signal line may be routed adjacent to each other.

As a result of the first and second segment signal lines that are connected to the same first segment electrode being routed adjacent to each other, the first and second segment signal lines can be routed so as to not intersect other segment signal lines, while realizing simple routing.

Also, in the present embodiment, the first segment terminal and the second segment terminal may be arranged adjacent to each other along a longitudinal direction of the liquid crystal driver.

In this way, the first and second segment signal lines connected to the first segment electrode are respectively connected to the first and second segment terminals that are arranged adjacent to each other along the longitudinal direction of the liquid crystal driver. With this, the first and second segment signal lines can be routed so as to not intersect other segment signal lines on the liquid crystal panel.

Also, in the present embodiment, the first segment terminal and the second segment terminal may be arranged adjacent to each other along a direction that intersects the longitudinal direction of the liquid crystal driver.

In this way, as a result of the first segment terminal and the second segment terminal being arranged along a direction that intersects the longitudinal direction of the liquid crystal driver, the size of the liquid crystal driver in the longitudinal direction can be reduced.

Also, in the present embodiment, the liquid crystal panel may include a second segment electrode and a third segment signal line connected to the second segment electrode. The first segment electrode may be connected to the liquid crystal driver via the first segment signal line and the second segment signal line, and the second segment electrode may be connected to the liquid crystal driver via the third segment signal line.

In this way, the first segment electrode to be connected to the liquid crystal driver via the first and second segment signal lines, which are two segment signal lines, can be provided along with the second segment electrode to be connected to the liquid crystal driver via the third segment signal line, which is one segment signal line. For example, the number of segment signal lines connected to a segment electrode can be selected in accordance with the importance of the segment, or the like.

Also, in the present embodiment, the liquid crystal driver may have short sides at the two ends of the long side, and include a third segment terminal to which the third segment signal line is to be connected. The first segment terminal and the second segment terminal may be arranged at a position, on the long side of the liquid crystal driver, farther from one of the short sides relative to the third segment terminal.

In this way, segment electrodes to each of which two segment signal lines are connected can be arranged around a central region of the liquid crystal panel. Also, segment electrodes to each of which one segment signal line is connected can be arranged outside of the central region. For example, when segment electrodes, of the segment electrodes included in the liquid crystal panel, whose importance is relatively high are arranged around the central region, the segment terminals can be arranged in accordance with the arrangement of the segment electrodes.

Also, in the present embodiment, the first segment electrode may be an electrode for displaying an icon. The second segment electrode may be an electrode for displaying a numeric character, a character, or a meter.

In this way, the first segment electrode for displaying an icon is to be connected to two segment terminals of the liquid crystal driver via two segment signal lines. On the other hand, the second segment electrode for displaying a numeric character, a character, or a meter is to be connected to one segment terminal in the liquid crystal driver via one segment signal line. With this, even if an anomaly has occurred in one of the two segment signal lines connected to the first segment electrode for displaying an icon, of the segment electrodes for displaying an icon, a numeric character, a character, and a meter, the first segment electrode for displaying an icon can be driven through the other segment signal line.

Also, in the present embodiment, the first segment electrode may be an electrode for a liquid crystal shutter.

In this way, even if an anomaly has occurred in one of the two segment signal lines connected to the first segment electrode for the liquid crystal shutter, the first segment electrode for the liquid crystal shutter can be driven through the other segment signal line. With this, the likelihood of the liquid crystal shutter not functioning can be reduced.

Also, in the present embodiment, the segment driving circuit may drive, in the first mode, the segment electrode through the first segment terminal and the second segment terminal, and drive, in the second mode, the segment electrode through the first segment terminal.

In this way, the segment driving circuit can drive both of a first segment electrode to which two segment signal lines are connected and a second segment electrode to which one segment signal line is connected. A user can select whether both of the first and second segment terminals are to be connected to a segment electrode or only the first segment terminal is to be connected to the segment electrode in accordance with the design for determining the arrangement of important icons in the liquid crystal panel, for example.

Also, in the present embodiment, the segment driving circuit may be set to the first or second mode based on the setting value stored in a register or a nonvolatile memory.

In this way, the segment driving circuit is set to the first or second mode based on the setting value stored in the register or the nonvolatile memory. The first or second mode can be set by a test apparatus or the like writing the setting value into the nonvolatile memory at the time of manufacturing, or a processing device or the like writing the setting value into the register when the liquid crystal driver is activated, for example.

Also, in the present embodiment, the segment driving circuit may include a segment signal output circuit that outputs a segment signal based on segment driving data, a first driving circuit that outputs the first segment driving signal to the first segment terminal based on the segment signal, and a second driving circuit that outputs, based on the segment signal, the second segment driving signal for driving the first segment electrode separately from the first segment driving signal to the second segment terminal.

In this way, when the first and second segment driving signals are the same signals, the segment driving circuit can output the same segment signal to the first and second segment terminals. Alternatively, the segment driving circuit can output the first and second segment driving signals for separately driving the first segment electrode to the first and second segment terminals, respectively.

Also, in the present embodiment, the liquid crystal driver may drive a liquid crystal panel including the segment electrode, the first segment signal line connected to the segment electrode, and the second segment signal line connected to the segment electrode. The liquid crystal driver may include the first segment terminal to be connected to the first segment signal line, the second segment terminal to be connected to the second segment signal line, and the segment driving circuit that outputs the first segment driving signal to the first segment signal line through the first segment terminal, and outputs the second segment driving signal to the second segment signal line through the second segment terminal.

In this way, even if an anomaly in the first segment driving signal output from the first segment terminal, a contact failure at the first segment terminal, or an anomaly in the first segment signal line has occurred, since the second segment driving signal is output from the second segment terminal to the second segment signal line, the driving of the first segment electrode can be continued.

Also, an electronic apparatus of the present embodiment includes the liquid crystal device according to any of the above descriptions.

Also, a mobile body of the present embodiment includes the liquid crystal device according to any of the above descriptions.

Note that although an embodiment has been described in detail above, a person skilled in the art will readily appreciate that it is possible to implement numerous variations and modifications that do not depart substantially from the novel aspects and effect of the disclosure. Accordingly, all such variations and modifications are also to be included within the scope of the disclosure. For example, terms that are used within the description or drawings at least once together with broader terms or alternative synonymous terms can be replaced by those other terms at other locations as well within the description or drawings. Also, all combinations of the embodiment and variations are also encompassed in the range of the disclosure. Moreover, the configuration and operation of the liquid crystal driver, the liquid crystal panel, the liquid crystal device, the electronic apparatus, and the mobile body are not limited to those described in the present embodiment, and various modifications are possible.

What is claimed is:

1. A liquid crystal device comprising:
   a liquid crystal panel; and
   a liquid crystal driver configured to drive the liquid crystal panel,
   wherein the liquid crystal panel includes:
      a first segment electrode;
      a first segment signal line connected to a first portion of the first segment electrode; and
      a second segment signal line connected to a second portion of the first segment electrode, the second portion being separate from the first portion, and the second segment signal line being separate from the first segment signal line, and
   the liquid crystal driver includes:
      a first segment terminal to be connected to the first segment signal line;
      a second segment terminal to be connected to the second segment signal line; and
      a segment driving circuit configured to output a first segment driving signal to the first segment signal line through the first segment terminal, and output a second segment driving signal to the second segment signal line through the second segment terminal.

2. The liquid crystal device according to claim 1, wherein the first segment signal line and the second segment signal line are routed adjacent to each other.

3. The liquid crystal device according to claim 1, wherein the first segment terminal and the second segment terminal are arranged adjacent to each other along a longitudinal direction of the liquid crystal driver.

4. The liquid crystal device according to claim 1, wherein the first segment terminal and the second segment terminal are arranged adjacent to each other along a direction that intersects a longitudinal direction of the liquid crystal driver.

5. The liquid crystal device according to claim 1, wherein the liquid crystal panel includes:
   a second segment electrode; and
   a third segment signal line connected to the second segment electrode,
   the first segment electrode is to be connected to the liquid crystal driver via the first segment signal line and the second segment signal line, and
   the second segment electrode is to be connected to the liquid crystal driver via the third segment signal line.

6. The liquid crystal device according to claim 5, wherein the liquid crystal driver has short sides at two ends of a long side of the liquid crystal driver, and includes a third segment terminal to which the third segment signal line is to be connected, and
   the first segment terminal and the second segment terminal are arranged at a position, on the long side, farther from one of the short sides relative to the third segment terminal.

7. The liquid crystal device according to claim 5, wherein the first segment electrode is an electrode for displaying an icon, and
   the second segment electrode is an electrode for displaying a numeric character, a character, or a meter.

8. The liquid crystal device according to claim 1, wherein the first segment electrode is an electrode for a liquid crystal shutter.

9. The liquid crystal device according to claim 1, wherein the segment driving circuit is configured to drive:

in a first mode, the first segment electrode through the first segment terminal and the second segment terminal, and in a second mode, the first segment electrode through the first segment terminal.

10. The liquid crystal device according to claim 9, wherein the segment driving circuit is set to the first or second mode based on a setting value stored in a register or a nonvolatile memory.

11. The liquid crystal device according to claim 1, wherein
the segment driving circuit includes:
a segment signal output circuit configured to output a segment signal based on segment driving data;
a first driving circuit configured to output the first segment driving signal to the first segment terminal based on the segment signal; and
a second driving circuit configured to output, based on the segment signal, a second segment driving signal for driving the first segment electrode separately from the first segment driving signal to the second segment terminal.

12. The liquid crystal device according to claim 1, wherein
the segment driving circuit is further configured to:
input a segment monitoring signal to the second segment terminal from the first segment electrode through the second segment signal line, and
detect an abnormality in the liquid crystal panel when a logic level of the segment monitoring signal does not match a logic level of a segment driving signal of the liquid crystal driver.

13. A liquid crystal driver configured to drive a liquid crystal panel including: (i) a segment electrode, (ii) a first segment signal line connected to a first portion of the segment electrode, and (iii) a second segment signal line connected to a second portion of the segment electrode, the second portion being separate from the first portion, and the second segment signal line being separate from the first segment signal line, the liquid crystal driver comprising:
a first segment terminal to be connected to the first segment signal line;
a second segment terminal to be connected to the second segment signal line; and
a segment driving circuit configured to output a first segment driving signal to the first segment signal line through the first segment terminal, and output a second segment driving signal to the second segment signal line through the second segment terminal.

14. The liquid crystal device according to claim 13, wherein
the segment driving circuit is further configured to:
input a segment monitoring signal to the second segment terminal from the segment electrode through the second segment signal line, and
detect an abnormality in the liquid crystal panel when a logic level of the segment monitoring signal does not match a logic level of a segment driving signal of the liquid crystal driver.

15. An electronic apparatus comprising:
the liquid crystal device according to claim 1.

16. A mobile body comprising:
the liquid crystal device according to claim 1.

* * * * *